(12) United States Patent
Okita et al.

(10) Patent No.: US 8,588,236 B2
(45) Date of Patent: Nov. 19, 2013

(54) VIRTUAL NETWORK MANAGEMENT SERVER AND NETWORK SYSTEM

(75) Inventors: Hideki Okita, Fuchu (JP); Masahiro Yoshizawa, Kokubunji (JP); Tsuyoshi Tanaka, Kokubunji (JP); Toshiaki Tarui, Sagamihara (JP)

(73) Assignees: Hitachi, Ltd.; Tokyo, Ltd.

( * ) Notice: Subject to any disclaimer, the term of this patent is extended or adjusted under 35 U.S.C. 154(b) by 553 days.

(21) Appl. No.: 12/852,242

(22) Filed: Aug. 6, 2010

(65) Prior Publication Data

US 2011/0058560 A1    Mar. 10, 2011

(30) Foreign Application Priority Data

Sep. 9, 2009    (JP) ................................ 2009-207794

(51) Int. Cl.
*H04L 12/28* (2006.01)
(52) U.S. Cl.
USPC .................... 370/395.53; 370/254; 370/404
(58) Field of Classification Search
USPC ............ 370/254, 255, 395.53, 400, 401, 404, 370/405, 406, 466; 709/219, 230
See application file for complete search history.

(56) References Cited

U.S. PATENT DOCUMENTS

| | | | |
|---|---|---|---|
| 6,788,681 B1 * | 9/2004 | Hurren et al. ................. | 370/389 |
| 2003/0101239 A1 * | 5/2003 | Ishizaki ........................ | 709/219 |
| 2007/0217364 A1 | 9/2007 | Kawakami | |
| 2008/0159147 A1 * | 7/2008 | Murata .......................... | 370/236 |
| 2008/0267090 A1 * | 10/2008 | Okita et al. ................... | 370/254 |
| 2010/0054140 A1 * | 3/2010 | Stjernholm et al. .......... | 370/252 |
| 2010/0226260 A1 * | 9/2010 | Zinjuvadia et al. ........... | 370/248 |
| 2010/0265829 A1 * | 10/2010 | Lu et al. ........................ | 370/242 |

FOREIGN PATENT DOCUMENTS

WO    WO2005/112356    11/2005

OTHER PUBLICATIONS

Station and Media Access Control Connectivity Discovery, IEEE Standards 802.1AB™, May 6, 2005.

* cited by examiner

*Primary Examiner* — Hassan Phillips
*Assistant Examiner* — Saba Tsegaye
(74) *Attorney, Agent, or Firm* — Antonelli, Terry, Stout & Kraus, LLP.

(57) ABSTRACT

A virtual network management server includes ring node information that manages configuration nodes for each of the rings, and ring connection I/F for each of the ring configuration nodes, generates the VLAN configuration information so as to transfer a frame that is transmitted or received by a designated gateway connection port and a designated base station connection port by the designated VLAN, and also so as to transmit or receive a tagged frame of the designated VLAN by the ring connection I/F of all of the ring to which the gateway connection switch belongs and the ring to which the base station connection switch belongs, and updates the VLAN configuration of the switch.

15 Claims, 37 Drawing Sheets

CONFIGURATION EXAMPLE OF CELLULAR PHONE SERVICE NETWORK

EXAMPLE OF NETWORK CONFIGURATION OF
TWO-STAGE RING NETWORK ACCORDING TO FIRST EMBODIMENT

CONFIGURATION EXAMPLE OF VIRTUAL NETWORK
MANAGEMENT SERVER ACCORDING TO FIRST EMBODIMENT

CONFIGURATION EXAMPLE OF SWITCH

EXAMPLE OF VLAN SETUP SEQUENCE ACCORDING TO FIRST EMBODIMENT

CONFIGURATION EXAMPLE OF GATEWAY/BASE STATION CONNECTION POSITION DESIGNATION SCREEN

FIG. 7

CONFIGURATION EXAMPLE OF DEVICE
CONNECTION POSITION INFORMATION

| VLAN | NODE (GATEWAY) | PORT (GATEWAY) | NODE (BASE STATION) | PORT (BASE STATION) |
|---|---|---|---|---|
| 40 | 1 | 2-1 | 14 | 2-1 |
|  |  |  |  |  |
|  |  |  |  |  |

1301   1302   1303   1304   1305

CONFIGURATION EXAMPLE OF
RING SETUP INFORMATION

CONFIGURATION EXAMPLE OF RING
CONFIGURATION NODE INFORMATION

132 RING CONFIGURATION NODE INFORMATION

| RING | NODE |
|---|---|
| 1 | 1, 2, 3, 4, 5 |
| 2 | 3, 6, 7, 8 |
| 3 | 4, 9, 10, 11 |
| 4 | 5, 12, 13, 14 |

FIG. 10
CONFIGURATION EXAMPLE OF RING CONNECTION I/F INFORMATION

133 RING CONNECTION I/F INFORMATION

| NODE | RING | I/F1 (PORT 1) | I/F2 (PORT 2) |
|---|---|---|---|
| 1 | 1 | 1-1 | 1-2 |
| 2 | 1 | 1-1 | 1-2 |
| 3 | 1 | 1-1 | 1-2 |
| 3 | 2 | 2-1 | 2-2 |
| 4 | 1 | 1-1 | 1-2 |
| 4 | 3 | 2-1 | 2-2 |
| 5 | 1 | 1-1 | 1-2 |
| 5 | 4 | 2-1 | 2-2 |
| 6 | 2 | 1-1 | 1-2 |
| 7 | 2 | 1-1 | 1-2 |
| 8 | 2 | 1-1 | 1-2 |
| 9 | 3 | 1-1 | 1-2 |
| 10 | 3 | 1-1 | 1-2 |
| 11 | 3 | 1-1 | 1-2 |
| 12 | 4 | 1-1 | 1-2 |
| 13 | 4 | 1-1 | 1-2 |
| 14 | 4 | 1-1 | 1-2 |

FIG. 11

FIRST EMBODIMENT: CONFIGURATION
EXAMPLE OF VLAN SETUP INFORMATION

134

VLAN SETUP INFORMATION

| NODE | PORT | VLAN | TYPE |
|---|---|---|---|
| 1 | 1-1 | 10,20,30,40 | Tagged |
| 1 | 1-2 | 10,20,30,40 | Tagged |
| 1 | 2-1 | 40 | Untagged |
| 2 | 1-1 | 10,20,30,40 | Tagged |
| 2 | 1-2 | 10,20,30,40 | Tagged |
| 3 | 1-1 | 10,20,30,40 | Tagged |
| 3 | 1-2 | 10,20,30,40 | Tagged |
| 3 | 2-1 | 10,20 | Tagged |
| 3 | 2-2 | 10,20 | Tagged |
| 4 | 1-1 | 10,20,30,40 | Tagged |
| 4 | 1-2 | 10,20,30,40 | Tagged |
| 4 | 2-1 | 10,30 | Tagged |
| 4 | 2-2 | 10,30 | Tagged |
| 5 | 1-1 | 10,20,30,40 | Tagged |
| 5 | 1-2 | 10,20,30,40 | Tagged |
| 5 | 2-1 | 10,40 | Tagged |
| 5 | 2-2 | 10,40 | Tagged |
| 12 | 1-1 | 10,40 | Tagged |
| 12 | 1-2 | 10,40 | Tagged |
| 13 | 1-1 | 10,40 | Tagged |
| 13 | 1-2 | 10,40 | Tagged |
| 14 | 1-1 | 10,40 | Tagged |
| 14 | 1-2 | 10,40 | Tagged |
| 14 | 2-1 | 40 | Untagged |

EXAMPLE OF FLOWCHART SHOWING OPERATION FLOW OF VLAN SETUP GENERATION PROGRAM

EXAMPLE OF FLOWCHART SHOWING DETAILED OPERATION FLOW OF VLAN SETUP PROCESSING FOR RING CONNECTION I/F

DISPLAY EXAMPLE OF SETUP RESULT
SCREEN ACCORDING TO FIRST EMBODIMENT

EXAMPLE OF NETWORK CONFIGURATION OF SINGLE-STAGE RING NETWORK ACCORDING TO FIRST EMBODIMENT

EXAMPLE OF NETWORK CONFIGURATION OF THREE-STAGE
RING NETWORK ACCORDING TO SECOND EMBODIMENT

CONFIGURATION EXAMPLE OF
VIRTUAL NETWORK MANAGEMENT SERVER

RING TYPE INFORMATION

| RING | TYPE |
|---|---|
| 1 | ACCOMMODATION |
| 2 | RELAY |
| 3 | RELAY |
| 4 | RELAY |
| 5 | ACCOMMODATION |
| 6 | ACCOMMODATION |
| 7 | ACCOMMODATION |

135

CONFIGURATION EXAMPLE OF RING TYPE INFORMATION SETUP SCREEN

EXAMPLE OF NETWORK CONFIGURATION OF THREE-STAGE RING NETWORK ACCORDING TO SECOND EMBODIMENT

EXAMPLE OF NETWORK CONFIGURATION OF TWO-STAGE
HYBRID RING NETWORK ACCORDING TO THIRD EMBODIMENT

CONFIGURATION EXAMPLE OF
VIRTUAL NETWORK MANAGEMENT SERVER

FIG. 27

CONFIGURATION EXAMPLE OF OVERHANGING LINK INFOMRATION ACCORDING TO THIRD EMBODIMENT

OVERHANGING LINK INFORMATION 136

| OVERHANGING LINK | NODE | PORT | NODE | PORT |
|---|---|---|---|---|
| 1 | 5 | 2-1 | 15 | 1-24 |
|  |  |  |  |  |
|  |  |  |  |  |

1361　1362　1363　1364　1365

OVERHANGING LINK INFORMATION SETUP
SCREEN ACCORDING TO THIRD EMBODIMENT

FIG. 31
CONFIGURATION EXAMPLE OF VLAN SETUP
INFORMATION ACCORDING TO THIRD EMBODIMENT

134 VLAN SETUP INFORMATION

| NODE | PORT | ALLOCATED VLAN | TYPE |
|---|---|---|---|
| 1 | 1-1 | 10,20,30,40 | Tagged |
| 1 | 1-2 | 10,20,30,40 | Tagged |
| 1 | 2-1 | 40 | Untagged |
| 2 | 1-1 | 10,20,30,40 | Tagged |
| 2 | 1-2 | 10,20,30,40 | Tagged |
| 3 | 1-1 | 10,20,30,40 | Tagged |
| 3 | 1-2 | 10,20,30,40 | Tagged |
| 3 | 2-1 | 10,20 | Tagged |
| 3 | 2-2 | 10,20 | Tagged |
| 4 | 1-1 | 10,20,30,40 | Tagged |
| 4 | 1-2 | 10,20,30,40 | Tagged |
| 4 | 2-1 | 10,30 | Tagged |
| 4 | 2-2 | 10,30 | Tagged |
| 5 | 1-1 | 10,20,30,40 | Tagged |
| 5 | 1-2 | 10,20,30,40 | Tagged |
| 5 | 2-1 | 40 | Tagged |
| 15 | 1-24 | 40 | Tagged |
| 15 | 1-1 | 40 | Untagged |
| | | | |

- 134a
- 134b
- 134c

EXAMPLE OF NETWORK CONFIGURATION OF THREE-STAGE
HYBRID RING NETWORK ACCORDING TO FOURTH EMBODIMENT

CONFIGURATION EXAMPLE OF
VIRTUAL NETWORK MANAGEMENT SERVER

FIG. 34

CONFIGURATION EXAMPLE OF OVERHANGING
LINK ACCORDING TO FOURTH EMBODIMENT

OVERHANGING LINK INFORMATION                                    136

| OVERHANGING LINK | NODE | PORT | NODE | PORT | TYPE |
|---|---|---|---|---|---|
| 1 | 5 | 2-1 | 18 | 1-1 | RELAY |
|   |   |     |    |     |       |
|   |   |     |    |     |       |

1361   1362   1363   1364   1365   1366

136b

EXAMPLE OF VLAN SETUP SEQUENCE ACCORDING TO FOURTH EMBODIMENT

CONFIGURATION EXAMPLE OF OVERHANGING LINK INFORMATION REGISTRATION SCREEN ACCORDING TO FOURTH EMBODIMENT

EXAMPLE OF FLOWCHART SHOWING OPERATION FLOW OF RELAY OVERHANGING LINK VLAN SETUP GENERATION PROGRAM

EXAMPLE OF NETWORK CONFIGURATION OF THREE-STAGE
HYBRID RING NETWORK ACCORDING TO FOURTH EMBODIMENT

VIRTUAL NETWORK MANAGEMENT SERVER AND NETWORK SYSTEM

CLAIM OF PRIORITY

The present application claims priority from Japanese patent application JP 2009-207794 filed on Sep. 9, 2009, the content of which is hereby incorporated by reference into this application.

FIELD OF THE INVENTION

The present invention relates to a virtual network management server and a network system, and more particularly to an operations and management technique of a virtual network configured on a packet communication network.

BACKGROUND OF THE INVENTION

Usually, a transmission network that is a communication network for connecting a, gateway and a base station exists on a network of a cellular phone service. In order to achieve a reduction in the costs and an increase in the capacity for the transmission network at the same time, there are many examples in which the transmission network is constructed by an Ethernet (registered trademark). In this case, an operation manager uses a virtual LAN (VLAN) to produce a virtual communication path that connects the gateway and the base station.

Up to now, when such a virtual communication path is manually produced, there is frequently used a configuration in which all of switches within the Ethernet are multiplexed with the VLANs, and a pertinent VLAN is selected by a port that is connected with the gateway or the base station. In this configuration, because a difference in setup between the switches is reduced, the setup work amount is suppressed.

However, in this configuration, because all of the switches are multiplexed by the VLANs, a broadcast frame and a multicast frame are transferred to all of the switches. As the number of base stations accommodated in the transmission network increases more, the number of multiplexed VLANs also increases more. This suffers from such a problem that frames of different VLANs are superimposed on each other to deteriorate a communication quality on the network.

WO05/112356 discloses a shortest path calculation system that minimizes the multiplicity of the VLANs in order to solve such a problem when all of switches are multiplexed by the VLANs. In this system, the network management server first obtains the shortest path between the gateway and the base station according to topology information on the network. The network management server then allocates the VLAN to a connection port between the switches on the shortest path, and produces a virtual communication path having the same form as that of the shortest path.

When the virtual communication path is produced through the shortest path calculation system, a transfer range of the broadcast frame and the multicast frame can be limited to the shortest path between the gateway and the base station. As a result, the communication quality is prevented from being deteriorated. Also, because a VLAN configuration process is automated, the operation work amount can be reduced.

The shortest path calculation system requires the topology information in order to obtain the shortest path. The topology information is obtained from the gathering of link information representative of a connection relation between two switches which are connected directly to each other. In order to automatically gather the link information from the switches within the network, there is used a control protocol between the switches such as a link-state type dynamic routing protocol or a link layer description protocol (LLDP) which is defined in "802.1ab—Station and Media Access Control Connectivity Discovery," IEEE Standard for Local and metropolitan area networks, IEEE, May, 2005.

Each of switches within the network periodically transmits a frame for exchanging a node identifier with that of an adjacent switch according to the control protocol. Then, the switch extracts a node identifier of the opposed switch from a frame received from the opposed switch, and automatically produces the link information of a link provided in the switch. The network management server gathers the link information produced on the switches from all of the switches within the network, and combines the link information together to produce the topology information on the network.

SUMMARY OF THE INVENTION

The automatic setup of the VLAN using the shortest path system described in the above-mentioned background art suffers from such a problem that the communication quality of the network is deteriorated. This is because the frame of the control protocol for gathering the link information deteriorates the communication quality of the network. In particular, in the network of a cellular phone service dealing with voice data, in order to remove an influence of the control frames on traffic as much as possible, a demand is made to reduce the control frames to be used. Accordingly, a demand is made to reduce the control frames in the allocation of the VLANs, similarly.

The present invention has been made to solve the above-mentioned problem with the related art, and therefore an object of the present invention is to provide a virtual network management server and a network system, which allocate a VLAN to switches that configures a path between designated two points and ports of the switches, and create a virtual communication path between a gateway and a base station in a network of a carrier, without using a control protocol for gathering the link information.

According to an aspect of the present invention, for example, in creation of a virtual communication path on a network where no loop exists in a portion other than a ring portion, which is configured by only rings having one or two ring stages between a gateway and abase station, a virtual network management server includes:

ring configuration information that describes ring configuration contents for each of switches, ring node information that gathers the combination of a ring identifier and one or a plurality of node identifiers as an element, ring connection I/F information that gathers the combination of the node identifier, the ring identifier, and two port numbers representing two ports used for connecting the switch corresponding to the node identifier to the ring corresponding to the ring identifier as an element, and a VLAN configuration that gathers the combination of the node identifier, the port number, one or a plurality of VLAN identifiers that is allocated to a port corresponding to the port number of the switch corresponding to the node identifier, and an identifier indicative of the type of the VLAN as an element, in which the virtual network management server first generates the ring node information and the ring connection I/F information based on the ring configuration information acquired from the switch within the network, then searches the configuration switches of the two rings that are each connected to the gateway and the base station from the ring node information, then searches ports used for ring connection by each of the switches from the ring connection I/F information, and then generates the VLAN configuration so as to transmit or receive a tagged frame of the designated VLAN by the searched ports used for the ring connection.

Also, according to an aspect of the present invention, for example, in creation of a virtual communication path on a network where no loop exists in a portion other than a ring portion, which is configured by only rings having three or more ring stages between a gateway and a base station, a virtual network management server further includes:

ring type information that gathers the combination of the ring identifier and the ring type as an element, in which the virtual network management server first registers a new element in the ring type information based on an input from a manager, then generates the VLAN configuration of the gateway connection ring and the base station connection ring, then extracts the ring identifiers from all of the elements where the value of the ring type of the ring type information is relay, then searches the ring connection I/F from the ring connection I/F information with respect to all of the nodes that configure all of the rings corresponding to the ring identifiers, and then generates the VLAN configuration so as to transmit and receive a tagged frame of the designated VLAN by the searched ring connection I/F.

Further, according to another aspect of the present invention, for example, in creation of a virtual communication path on a network which is configured by rings and a direct connection link, having two ring or direct connection link stages between a gateway and a base station, a virtual network management server includes pier link information having, as an element, the combination of an identifier of an pier link, an identifier of one switch connected to one end of the pier link, a port number of an pier link connection port of the one switch, an identifier of the other switch connected to the other end of the pier link, and a port number of an pier link connection port of the other switch, in which, upon completing the creation of the VLAN configuration of the gateway connection ring, the virtual network management server searches an element in which any one of the two node identifiers matches a node identifier of the base station connection node designated by a manager among the elements of the pier link information, and generates the VLAN configuration so as to transmit or receive a tagged frame of the designated VLAN by two ports which are both ends of the searched pier link.

Further, according to still another aspect of the present invention, for example, in creation of a virtual communication path on a network which is configured by rings and a direct connection link, having three or more ring or direct connection link stages between a gateway and a base station, each element of the pier link information includes an identifier indicative of the type of the link, and upon completion of the VLAN configuration generation of the gateway connection ring, the base station connection ring, the relay ring, and the base station connection pier link, the virtual network management server searches the pier link information, extracts an pier link having switches at both ends thereof connected to neither the gateway nor the base station among all of the pier links within the network, having an identifier whose type represents the relay pier link, and having the designated VLAN unallocated, and generates the VLAN configuration so as to transmit or receive a tagged frame of the designated VLAN by ports connected to both ends of the pier link.

In this description, a specific means of the virtual network is VLAN. However, the present invention can be implemented in the same manner as that of the VLAN on a communication system that can construct a plurality of independent virtual networks on a physical network by using a capsulated packet or frame. For example, in the network using a provider backbone bridge (PBB) defined in IEEE802.1ah standards, B-VID and I-SID are combined together instead of the VLAN ID, or set as the respective identifiers of the virtual network, thereby enabling the present invention to be implemented, likewise. Also, in the network using the multi-protocol label switching (MPLS), a label is set as the identifier of the virtual network, thereby enabling the present invention to be implemented, likewise.

According to a first aspect of the present invention, there is provided a virtual network management server that sets up a virtual network for communicating between a gateway and a base station through one or a plurality of rings in a network where a frame is transmitted and received among only a plurality of selected devices within the network by using a virtual network in which plurality nodes are connected to each other to configure the ring, and a communication range is virtually divided by a virtual network identifier stored in a frame header, and the virtual network management server includes:

a ring node information storage region in which the combination of a ring identifier and node identifiers of the nodes that configure the ring are stored; and a processing unit, wherein the processing unit designates a first node identifier of a first node that is connected with the gateway, and a second node identifier of a second node that is connected with the base station, in which the processing unit specifies a node identifier belonging to the same ring as that of the first node of the designated first node identifier, and a node identifier belonging to the same ring as that of the second node of the designated second node identifier with reference to the ring node information storage region, and in which the processing unit transmits a setup instruction for setting up the virtual network between the gateway and the base station to the respective nodes indicated by the specified node identifiers.

According to a second aspect of the present invention, there is provided a network system that transmits and receives a frame among only a plurality of selected devices within the network by using a virtual network in which a communication range is virtually divided by a virtual network identifier stored in a frame header, and the network system includes:

a plurality of nodes that configure a ring; and a virtual network management server that sets up a virtual network for communicating between a gateway and a base station through one or a plurality of rings, in which the virtual network management server includes:

a ring node information storage region in which the combination of a ring identifier and node identifiers of the nodes that configure the ring are stored; and a processing unit, in which the processing unit designates a first node identifier of a first node that is connected with the gateway, and a second node identifier of a second node that is connected with the base station, in which the processing unit specifies a node identifier belonging to the same ring as that of the first node of the designated first node identifier, and a node identifier belonging to the same ring as that of the second node of the designated second node identifier with reference to the ring node information storage region, and in which the processing unit transmits a setup instruction for setting up the virtual network between the gateway and the base station to the respective nodes indicated by the specified node identifiers.

According to an aspect of the present invention, there is advantageous in that, in automatically creating the virtual communication path using the VLAN by the virtual network management server on the layer-2 network of the carrier, control frame transmission and reception for creating link information within the network are not required to enable a communication quality of the network to be improved.

BRIEF DESCRIPTION OF THE DRAWINGS

FIG. 7 is a diagram illustrating device connection position information;

FIG. 10 is a diagram illustrating a configuration example of ring connection I/F information;

FIG. 11 is a diagram illustrating a configuration example of VLAN configuration information;

FIG. 27 is a diagram illustrating a configuration example of pier link information according to the third embodiment;

FIG. 31 is a diagram illustrating a configuration example of VLAN configuration information according to the third embodiment;

FIG. 34 is a diagram illustrating a configuration example of pier link information according to the fourth embodiment;

DETAILED DESCRIPTION OF THE PREFERRED EMBODIMENTS

Hereinafter, embodiments of the present invention will be described with reference to the accompanying drawings.

A network management server according to the present invention is applied to networks each internally including at least one ring.

A case in which a network is configured by only a ring in such networks will be first described according to a first embodiment and a second embodiment. In the first embodiment, cases in which the number of ring stages between a gateway and a base station is one and two will be described. In the second embodiment, a case in which the number of ring stages between the gateway and the base station is three or more will be described.

Then, a case in which a link (pier link) for connecting the network and the rings is provided will be described with reference to a third embodiment and a fourth embodiment. In the third embodiment, a case in which the number of ring or pier link stages between the gateway and the base station is two will be described. In the fourth embodiment, a case in which the number of ring or pier link stages between the gateway and the base station is three will be described.

Figure 1:
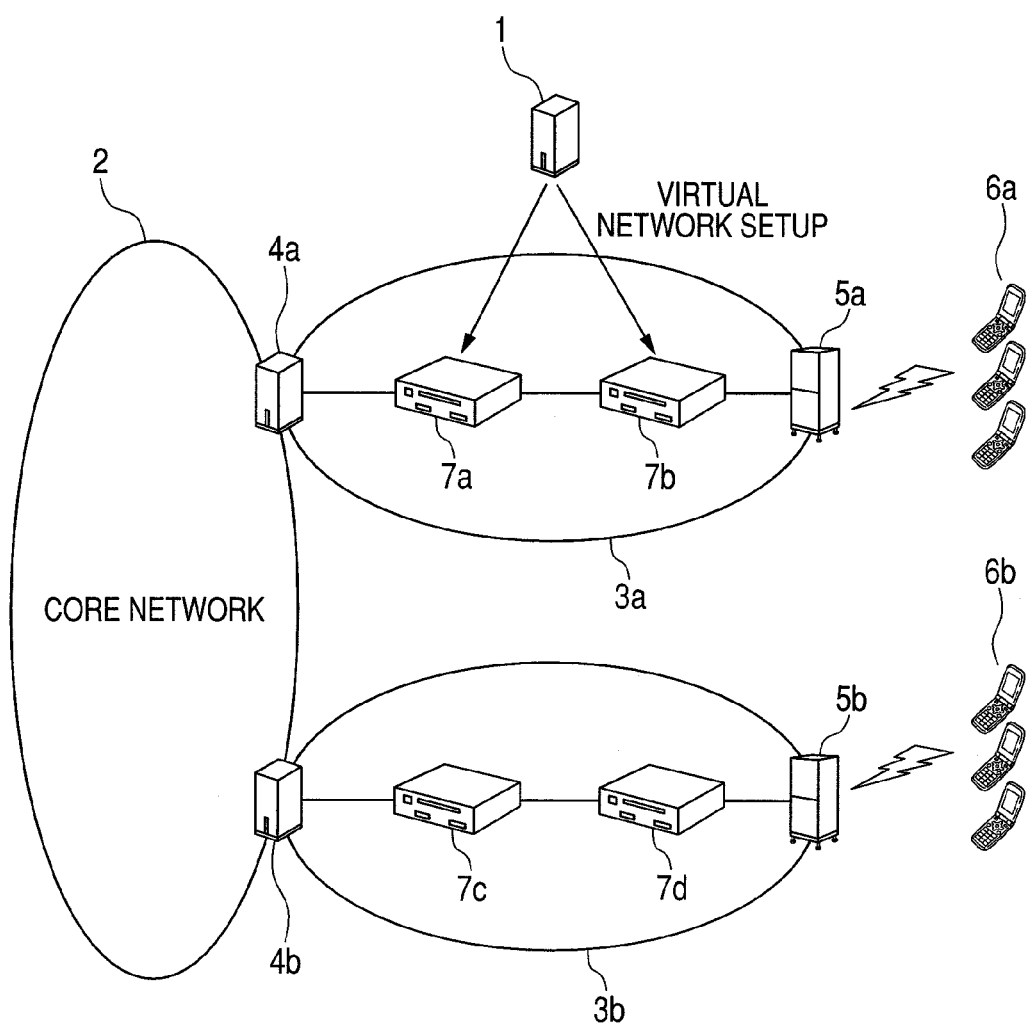
FIG. 1 is a diagram illustrating a configuration example of a cellular phone service network.

FIG. 1 shows a system configuration example of a network of a carrier. The network is roughly classified into a core network 2 and layer-2 networks 3a and 3b. A virtual network management server 1, gateways 4a, 4b, radio base stations 5a, 5b, terminals 6a, 6b, and VLAN-compliant switches 7a to 7d, which implement the present invention, are included in those networks. The layer-2 networks 3a and 3b each create a virtual communication path of a layer 2 between a gateway 4 and a radio base station 5 by means of a VLAN. The virtual network management server 1 manages the VLAN compliant switches (hereinafter referred to also as "nodes") 7a to 7d among those components.

First Embodiment

Figure 2:
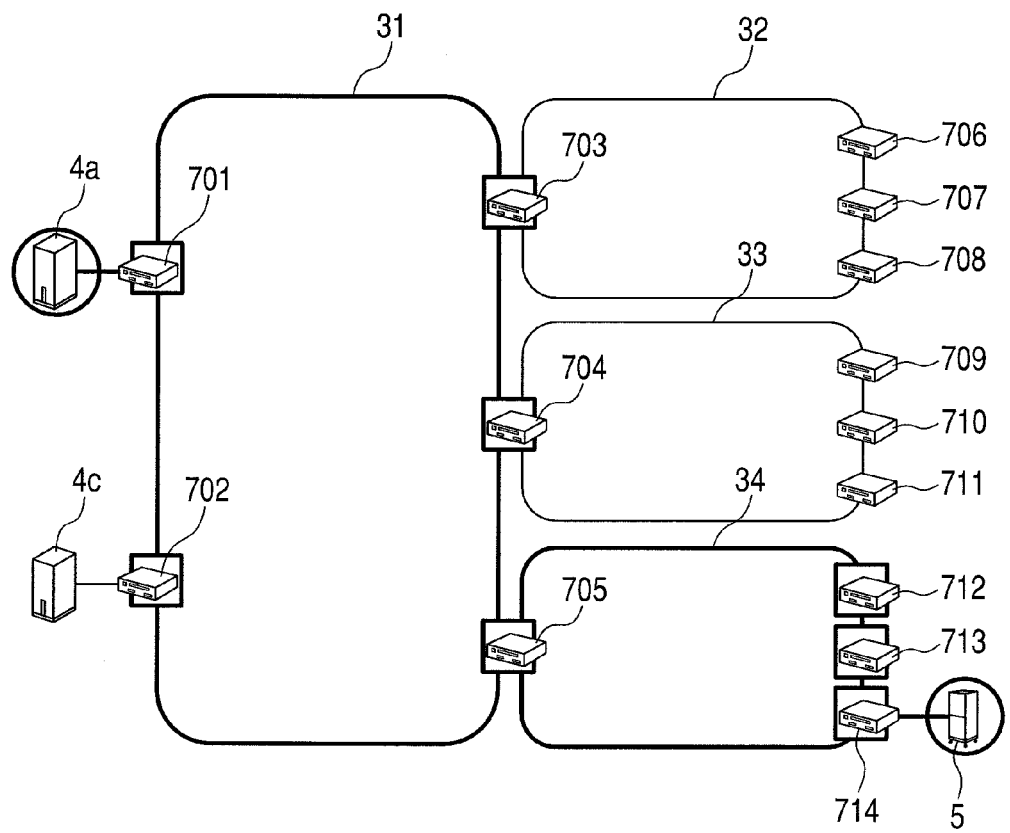
FIG. 2 is a diagram illustrating a configuration example of a network configuration of a two-stage ring network according to a first embodiment.

FIG. 2 shows a network configuration example within the layer-2 network 3 according to a first embodiment. The layer-2 network 3 is exemplified by two-stage rings in which one core ring 31 is connected with three branch rings 32 to 34. The core ring 31 accommodates the gateways 4a and 4c through switches 701 and 702. Also, the core ring 31 accommodates the branch rings 32 to 34 through switches 703 to 705, respectively. Also, the core ring 31 accommodates the branch rings 32 to 34 through the switches 703 to 705, respectively. For example, those branch rings 32 to 34 are configured in such a manner that the switch 703 and switches 706 to 708 are connected in a ring shape in turn, the switch 704 and switches 709 to 711 are connected in the ring shape in turn, and the switch 705 and switches 712 to 714 are connected in the ring shape in turn.

In this network configuration example, the base station 5 is connected to the switch 714 of the branch ring 34. The links indicated by bold lines among the links between the switches 7 in FIG. 2 are indicative of VLAN configuration target links in the case where the virtual communication paths are created between the base station 5 and the gateway 4a by the VLAN. In the network configuration example, connection links between the switches configuring the core ring 31 and the branch ring 34 are VLAN configuration target links. The switches each surrounded by a box indicated by a bold line in FIG. 2 represent VLAN configuration target switch. In this example, the switches 701 to 705 and 712 to 714 are the VLAN configuration target switches.

Figure 3:
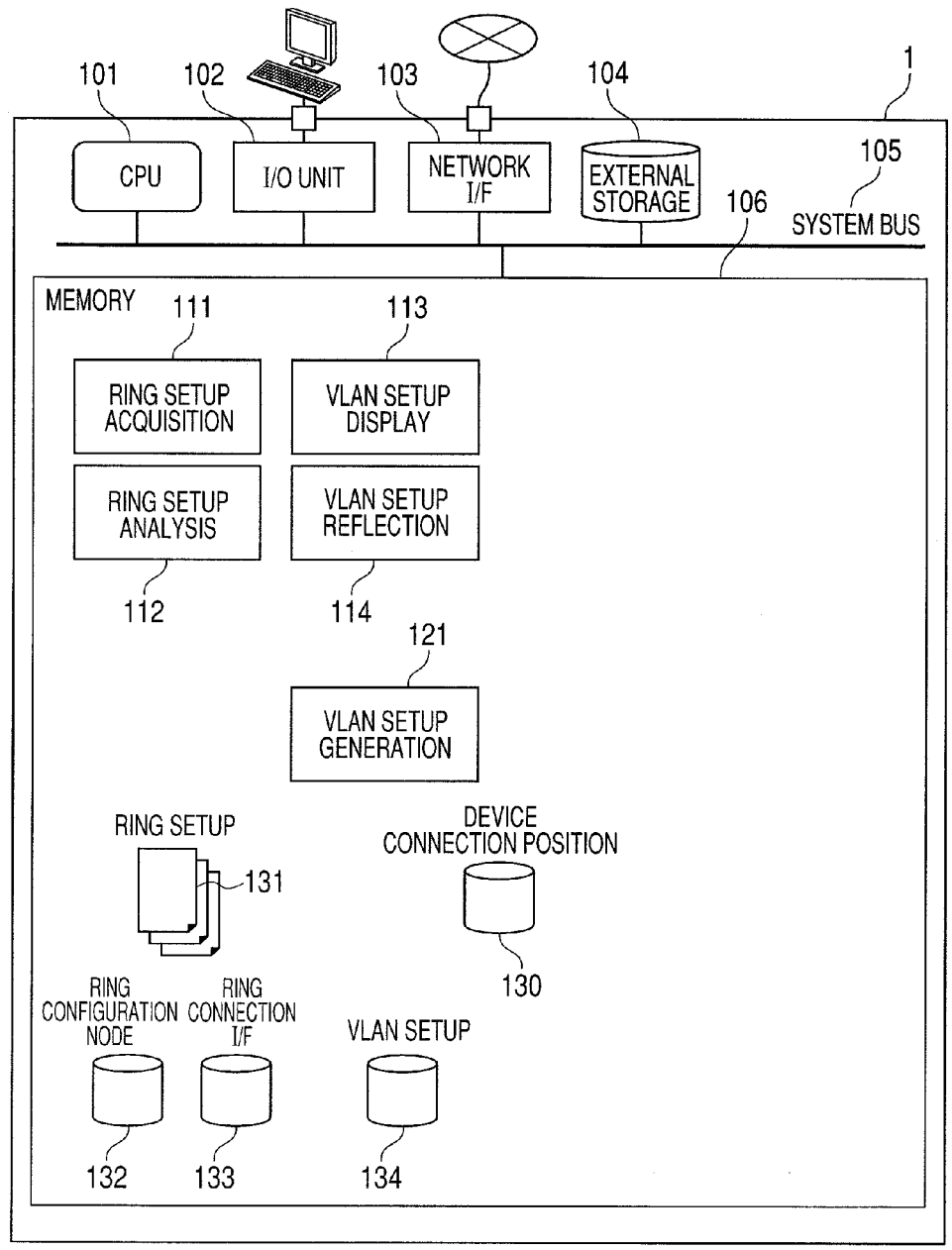
FIG. 3 is a diagram illustrating a configuration example of a virtual network management server according to the first embodiment.

FIG. 3 shows a configuration example of the virtual network management server 1 according to this embodiment. The virtual network management server 1 includes a CPU (processing unit) 101, an I/O unit 102, a network I/F 103, an external storage unit 104, a system bus 105, and a memory (storage region) 106. On the memory 106, a ring configuration acquisition program 111, a ring configuration analysis program 112, a VLAN configuration display program 113, and a VLAN configuration reflection program 114 for creating information required for VLAN configuration generation are read and executed by the CPU 101. Also, on the memory 106, a VLAN configuration generation program 121 for generating the VLAN configuration is read and executed by the PCU 101. Also, the memory 106 includes device connection position information 130, ring configuration information 131, ring node information 132, ring connection interface (I/F) information 133, and VLAN configuration information 134, for use in those programs 121 to 123. The CPU 101 executes the respective programs on the memory.

Figure 4:
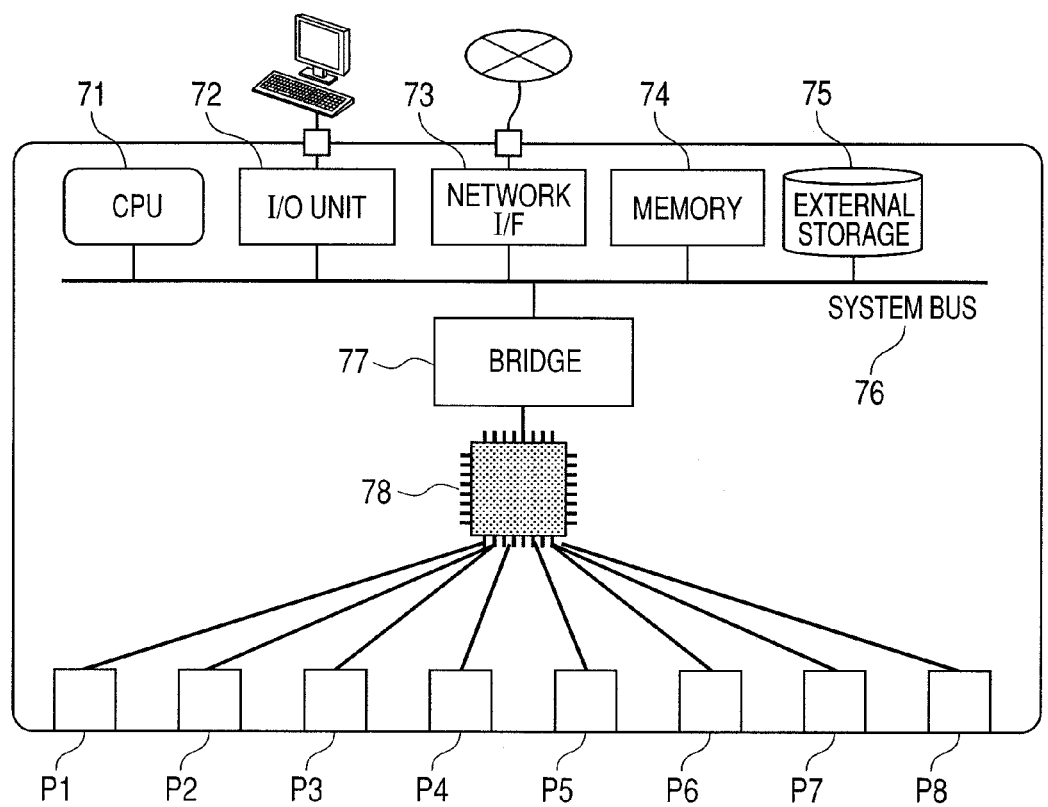
FIG. 4 is a diagram illustrating a configuration example of a switch.

FIG. 4 shows a configuration example of the switch 7. The switch 7 includes a CPU 71, an I/O unit 72, a network I/F 73, a memory 74, an external storage unit 75, a system bus 76, bridge 77, a frame transfer function unit 78, and ports P1 to P8. The switch 7 transmit frames that are received by the ports P1 to P8 from corresponding ports through the frame transfer function unit 78 according to their destination addresses.

Figure 5:
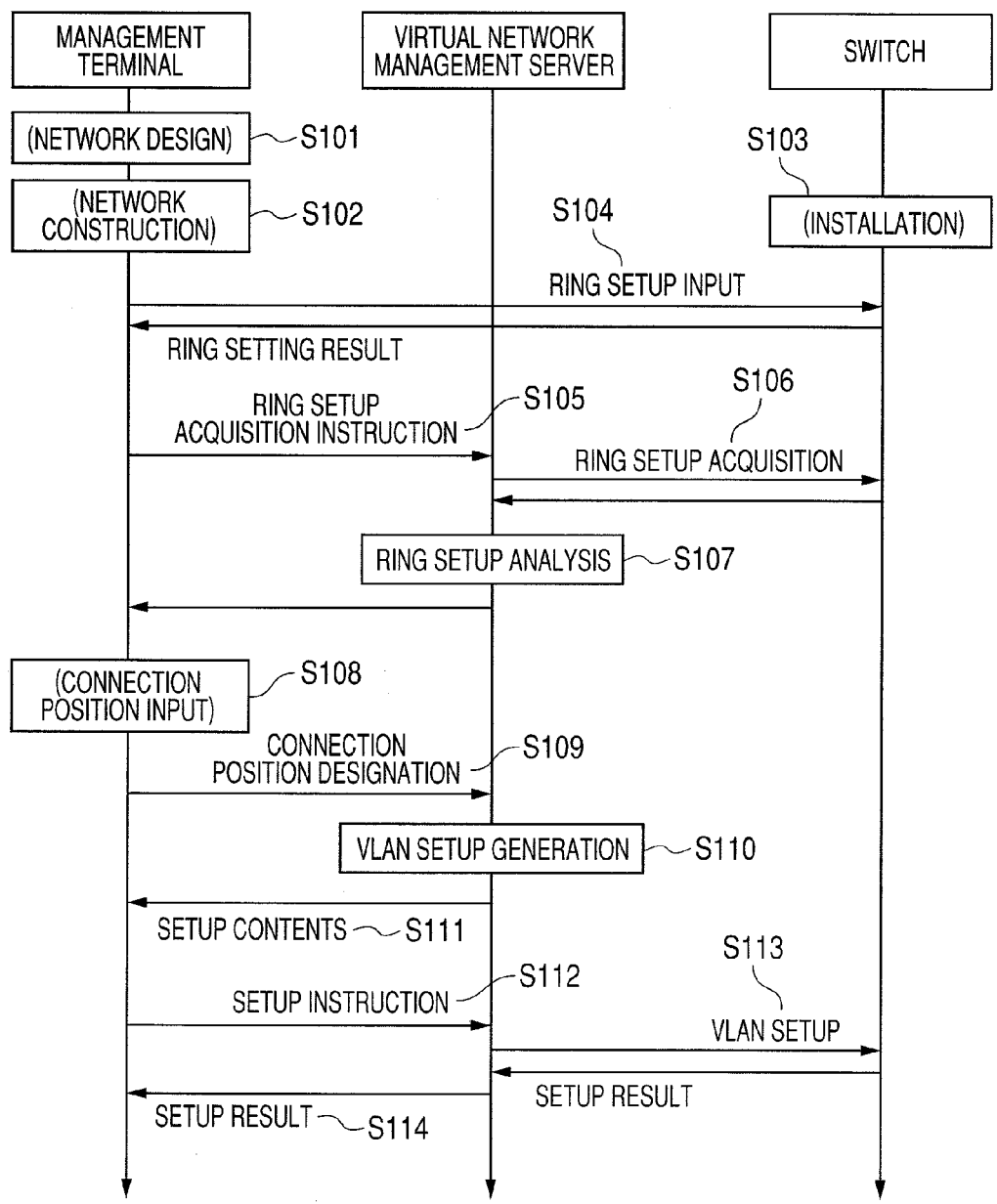
FIG. 5 is a diagram illustrating a VLAN configuration sequence according to the first embodiment.

FIG. 5 shows a sequence of the layer-2 network of the carrier when a manager of the network sets up the virtual communication path VLAN with the use of the virtual network management server 1 of this embodiment.

First, the manager designs where to arrange the switches 7, and which switch 7 is connected to which switch 7 for configuring the network (S101). The manager installs the switches 7 at the determined installation sites based on the network design results, and connects the switches 7 to each other by a network cable to construct the network (S102, S103). A management terminal inputs ring configuration that collects set values such as a ring identifier and a control target port number required for ring control to a switch 7 to be made redundant by the ring configuration among the switches 7 which configure the network through the operation of the manager (S104). The above operation makes the ring control of the switches 7 within the network effective, and enables a communication to be continued even when the link fails on the ring.

The management terminal instructs the virtual network management server 1 to acquire the ring configuration from the switch 7 (S105). Upon receiving this instruction, the virtual network management server 1 acquires the setup contents of the ring control from the switches 7 within the network to be managed (S106), and stores the setup contents as the ring configuration information 131 for each of the switches 7 in the memory 106. The virtual network management server 1 analyzes the ring configuration 131 to generate the ring node information 132 and the ring connection I/F information 133 (S107). The detailed processing will be described later.

Then, the manager determines by which port P of which switch 7 within the network the gateway 4 and the base station 5 should be connected to each other, and the management terminal inputs the connection position information of the gateway 4 and the radio base station 5 by the operation of the manager (S108). The management terminal designates the connection position to the virtual network management server 1 (S109). The virtual network management server 1 generates the VLAN configuration information 134 that gathers information indicative of which port of which switch the VLAN is set up to from the designated connection position, and the ring node information 132 and the ring connection I/F information 133 which have been generated in advance (S110), and displays the contents of the VLAN configuration on a screen of the management terminal (S111). The detailed processing of Step S111 will be described later. When the displayed VLAN configuration contents have no problem, the management terminal instructs the virtual network management server 1 to reflect the VLAN configuration on the switch 7 through the operation of the manager (S112). The virtual network management server 1 changes the VLAN configuration of the pertinent switch 7 based on the VLAN configuration information 134 (S113), and displays the setup result on the screen of the management terminal (S114).

Figure 6:
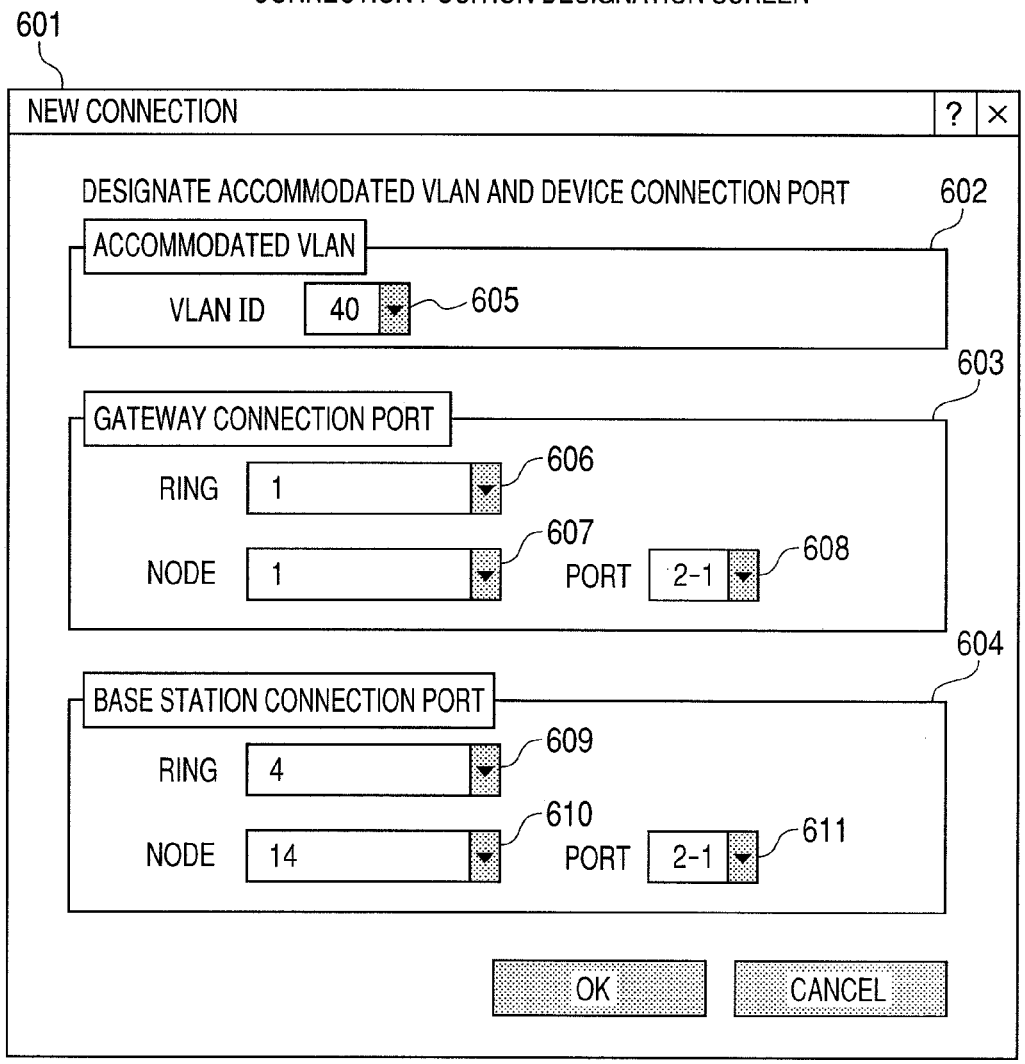
FIG. 6 is a diagram illustrating a configuration example of a gateway/base station connection position designation screen.

FIG. 6 shows a configuration example of a connection position designation GUI of the virtual network management server 1, which is used in the connection position designation S109 of the gateway and the base station by the manager. The connection position designation GUI 601 includes an accommodation VLAN designation area 602, a gateway connection port designation area 603, and a base station connection port designation area 604.

Among those areas, the accommodation VLAN designation area 602 includes an accommodation VLAN input box 605 for receiving an identifier of the VLAN used for creating the virtual communication path.

Also, the gateway connection port designation area 603 includes a ring input box 606 for inputting the ring identifier of a connection target ring of a connection target switch of the gateway 4, a gateway connection node input box 607 for inputting the node identifier of the connection target switch of the gateway 4, and a gateway connection port input box 608 for inputting the port number of the connection target port of the gateway 4.

Also, the base station connection port designation area 604 includes a ring input box 609 for inputting the ring identifier of the connection target ring of the connection target switch of the base station 5, a base station connection node input box 610 for inputting the node identifier of the connection target switch of the base station 5, and a base station connection port input box 611 for inputting the port number of the connection target port of the base station 5.

The virtual network management server 1 stores, in the device connection information 130, the VLAN identifier, the node identifier of the gateway connection target switch, the port number of the gateway connection target port, the node identifier of the base station connection target switch, and the port number of the base station connection target port, which have been input to the connection position designation GUI.

FIG. 7 shows a configuration example of the device connection position information 130 provided in the virtual network management server 1.

The device connection information 130 is represented by a table having the combination of a VLAN identifier 1301, a node identifier 1302 of the gateway connection target switch, a port number 1303 of the gateway connection target port, a node identifier 1304 of the base station connection target switch, and a port number 1305 of the base station connection target port as an entry.

The elements of the entry store, in order, the values input to the accommodation VLAN input box 605 of the connection position designation GUI, the gateway connection node input box 607, the gateway connection port input box 608, the base station connection node input box 610, and the base station connection port input box 611 of the connection position designation GUI in FIG. 6 therein.

Figures 8, 9:
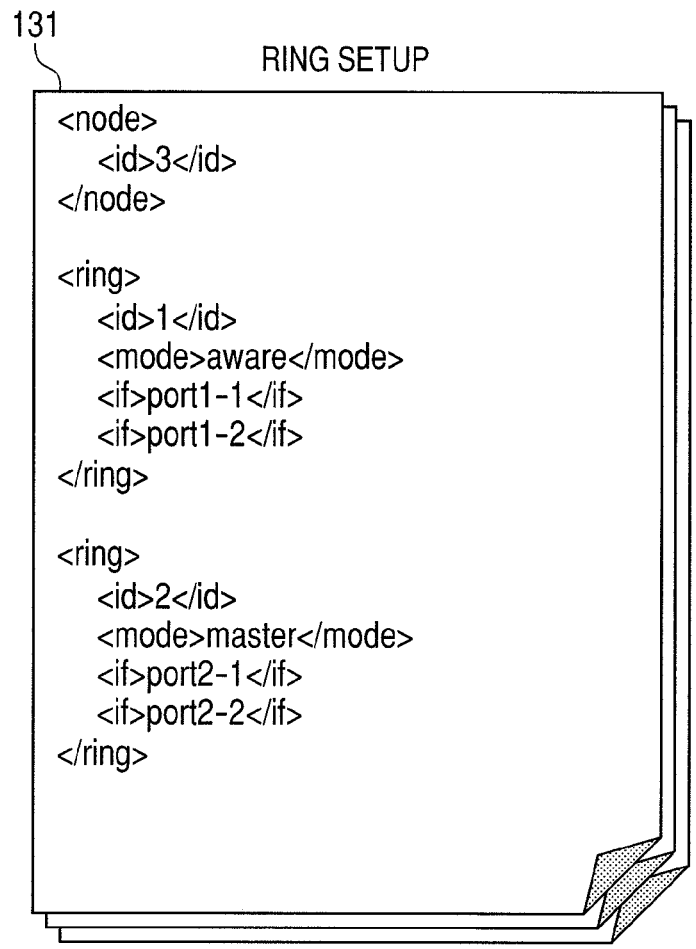
FIG. 8 is a diagram illustrating ring configuration information.
FIG. 9 is a diagram illustrating a configuration example of ring node information.

FIG. 8 shows a configuration example of ring configuration information acquired by the virtual network management server 1 from the switch 7 within the network. This embodiment shows an example in which the ring configuration information 131 is described by an extensible modeling language (XML). In this embodiment, one XML document is created as the ring configuration information 131 in each of the switches 7. In this embodiment, the XML document includes a node element for identifying a target switch 7, and one or plural ring elements representative of setup in each of the rings within the switch 7. The node element includes an id element indicative of the identifier of a unique switch 7 within the network. The ring element includes one id element indicative of a ring identifier for uniquely identifying the ring within the network, one mode element indicative of the function of the switch within the ring, and two if elements indicative of the ring connection I/F. The mode element indicates whether the switch 7 is a master of the ring control, or is permeable to the ring control and not aware of the ring control, within the ring designated by the ring element.

FIG. 9 shows a configuration example of the ring node information 132 provided in the virtual network management server 1. The ring node information 132 manages the switches that configure the ring for each of the rings within the network. In this embodiment, the ring node information 132 is represented by a table having the combination of the ring identifier that is allocated to each of the rings for uniquely discriminating the ring within the network, and one or plural node identifiers that is allocated to each of the switches for uniquely discriminating the switch within the network, as one entry.

In this example, it is assumed that the identifiers of the rings 31 to 34 are 1 to 4, respectively. Also, it is assumed that the node identifiers of the switches 701 to 714 are 1 to 14, respectively. Upon completion of the ring configuration analysis sequence S107 by the virtual network management server 1, for example, in the case of the network configuration example shown in FIG. 2, the node identifiers 1 to 5 are stored in the entry of the ring 1. Likewise, the node identifiers 3 and 6 to 8 are stored in the entry of the ring 2, the node identifiers 4 and 9 to 11 are stored in the entry of the ring 3, and the node identifiers 5 and 12 to 14 are stored in the entry of the ring 4.

FIG. 10 shows a configuration example of the ring connection I/F information 133 provided in the virtual network management server 1. The ring connection I/F information 133 manages I/F used for connection to the ring for each of the switches within the network. In this embodiment, the ring connection I/F information 133 is represented by a table having the combination of one node identifier that is allocated to each of the switches for uniquely discriminating the switch within the network, one ring identifier that is allocated to each of the rings for uniquely identifying the ring within the network, and two port numbers that are allocated to each I/F for uniquely identifying the I/F within the switch, as one entry.

In this embodiment, ports of port numbers 1-1 and 1-2 are used for the ring connection port at each switch. Also, in the switch that is connected to the plural rings, it is assumed that the core ring is first connected, and ports of port numbers 2-1 and 2-2 are used for connection to a second ring. Upon completion of the ring configuration analysis sequence S107 by the virtual network management server 1, the respective port numbers 1-1 and 1-2 are stored in two of a row of the port numbers of the nodes 1, 2 and 6 to 14 and a row of the port numbers where the ring identifier of the nodes 3 to 5 is 1. Also, the respective port numbers 2-1 and 2-2 are stored in two rows of the port numbers where the respective identifiers of the nodes 3 to 5 are 2 to 4.

FIG. 11 shows a configuration example of the VLAN configuration information 134 provided in the virtual network management server 1 according to the first embodiment. The VLAN configuration information 134 manages in which port the VLAN is set up within the network. The VLAN configuration information 134 is used for managing both of the allocation of the VLAN to the inter-switch connection port, and the allocation of the VLAN to ports for connecting the gateway and the base station.

The VLAN configuration information 134 is represented by a table having the combination of one node identifier that is allocated to each of the switches for uniquely identifying the switch within the network, one port number that is allocated to each of the ports for uniquely identifying the port within the switch, one or plural VLAN identifiers representative of the VLAN that is allocated to each of the ports, and one type identifier representing whether there is a VLAN tag of the frame which is transmitted or received by the port, or not, as one entry.

In this embodiment, it is assumed that the VLAN identifier 10 is used for the virtual communication path that accommodates the base stations connected to the respective branch rings 32 to 34 across those rings. Also, it is assumed that the VLAN identifier 20 is used for the virtual communication path that accommodates only the base station which is connected to the ring 32, and likewise, the respective VLAN identifiers 30 and 40 are used for the virtual communication paths that accommodate only the base stations which are connected to the rings 33 and 34.

After the VLAN configuration generation processing S110 by the virtual network management server 1, the entries of the port of the port number 2-1 of the switch 1 connecting the gateway 4*a* and the port of the port number 2-1 of the switch 14 that is connected with the base station 5 are the allocation VLAN of only 40 among the entries of the VLAN configuration information 134. Also, all of the types of the entries corresponding to those ports are "untagged" representing that a normal frame to which no VLAN tag is allocated is transmitted or received.

Also, the entries corresponding to the inter-switch connection I/F of the switches configuring the ring 31 that is the core ring are the allocation VLAN of 10, 20, 30, and 40. Also, the entries corresponding to the inter-switch connection I/F of the switches configuring the branch ring 34 that accommodates the base station 5 are the allocation VLAN of 10 and 40. All of the types of the entries corresponding to those inter-switch connection I/F are "tagged" representing that a normal frame to which a VLAN tag is allocated is transmitted or received.

Figure 12:
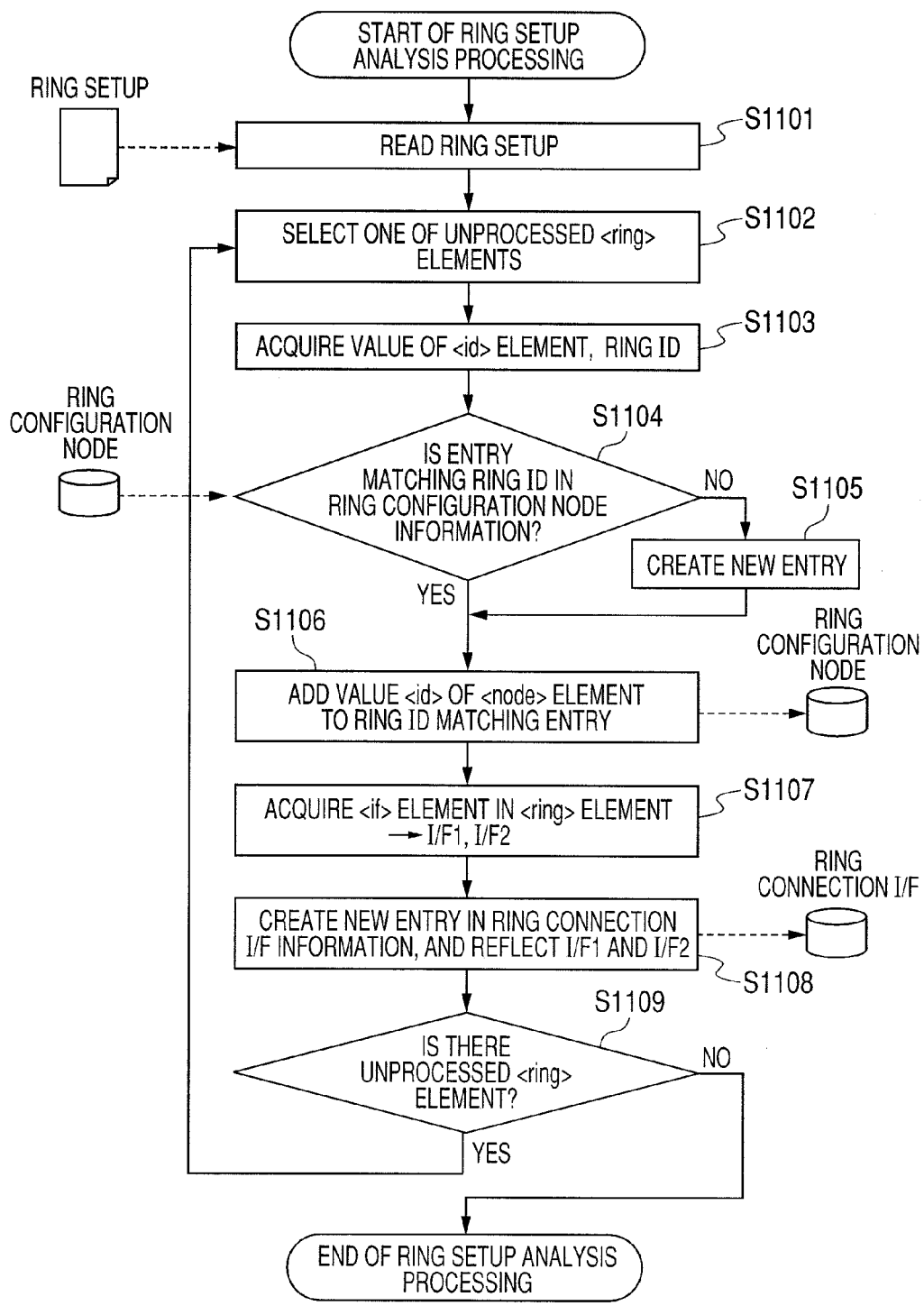
FIG. 12 is a flowchart illustrating an example of an operation flow of a ring configuration analysis program.

FIG. 12 is a flowchart showing an example of the operation flow of the ring configuration analysis program 112. According to this operation flow, the virtual network management server 1 executes the ring configuration analysis sequence S107 in FIG. 5, and generates the ring node information 132 and the ring connection I/F information 133 based on the ring configuration information 131.

Upon starting the processing, the ring configuration analysis program 112 reads a ring configuration film from the ring configuration information 131 (S1101). The ring configuration analysis program 112 selects one ring element from the ring configuration film described in an XML format (S1102), acquires a value of the id element in the ring element, and holds the value as an ID (S1103). The ring configuration analysis program 112 checks whether a matching entry having a ring identifier that matches this ring ID exists in the ring node information 132, or not (S1104). When there is no matching entry, the ring configuration analysis program 112 creates a new entry for a ring represented by this ring ID in the ring node information 132 (S1105).

Then, the ring configuration analysis program 112 adds a value of the id element in the node element of the ring configuration file to a value at the row of the node of the matching entry when there is the matching entry, and to the value at the row of the node of the new entry when there is no matching entry (S1106).

Then, the ring configuration analysis program 112 acquires two port numbers which are the values of two if elements in the ring element of the ring configuration file (S1107). Then, the ring configuration analysis program 112 creates a new entry in the ring connection I/F information 133. The ring configuration analysis program 112 stores the value of the id element of the node element of the ring configuration file in the node row of the new entry. Also, the ring configuration analysis program 112 stores the value of the id element of the selected ring element in the ring row of the new entry. The ring configuration analysis program 112 stores the two port numbers acquired in Sequence S1107 in the rows of I/F1 and I/F2 of the new entry, in order one by one (S1108).

Finally, the ring configuration analysis program 112 checks whether the unprocessed ring element remains in the read ring configuration file, or not. When the unprocessed ring element remains, the ring configuration analysis program 112 selects the unprocessed ring element, and repeats sequences of S1102 to S1108 with respect to the selected ring element. When the sequences of S1102 to S1108 are completed with respect to all of the ring elements in the ring configuration film, and no unprocessed ring element remains, the ring configuration analysis program 112 completes the ring configuration analysis processing, and returns the processing to a calling source program.

Figure 13:
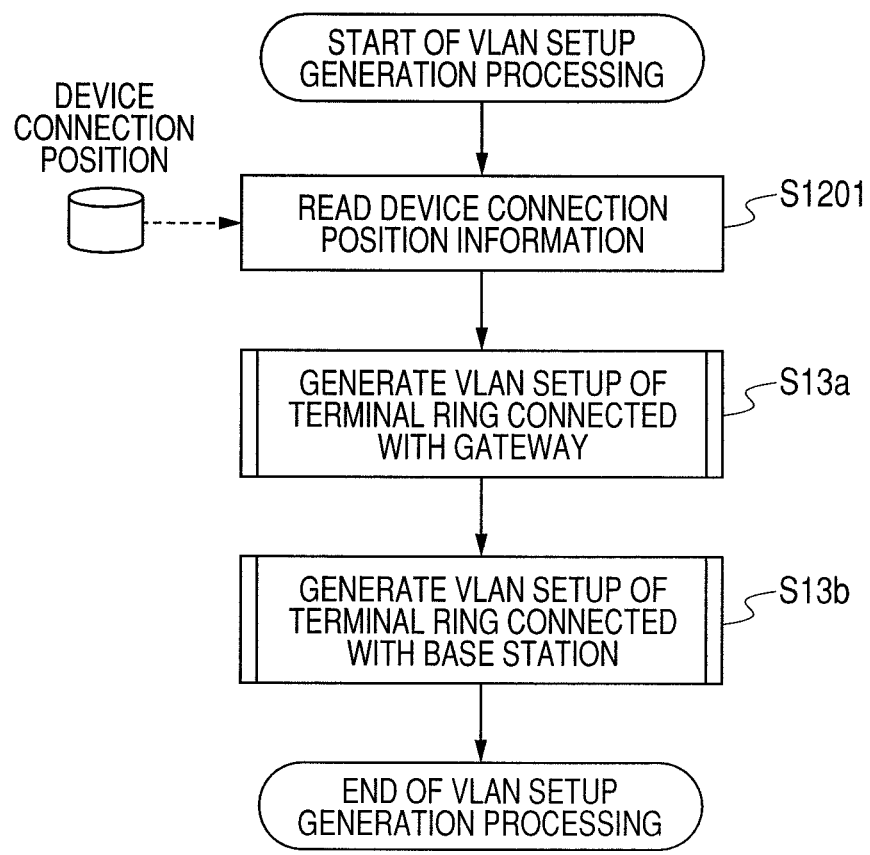
FIG. 13 is a flowchart illustrating an example of an operation flow of a VLAN configuration generation program.

FIG. 13 exemplifies a flowchart of the operation flow of the VLAN configuration generation, program 121. The virtual network management server 1 according to this embodiment executes the VLAN configuration sequence S110 according to this flowchart.

The VLAN configuration generation program 121 first reads the device connection position information 130, and acquires the allocation VLAN identifier, the gateway connection node identifier, the gateway connection port number, the base station connection node identifier, and the base station connection port number.

Then, the VLAN configuration generation program 121 executes the VLAN configuration generation processing on the ring 31 that configures a terminal of the network and connects the gateway (S13*a*). In this case, the VLAN configuration generation program 121 gives the gateway connection node identifier, the gateway connection port number, and the allocation VLAN identifier to the argument of the VLAN configuration generation processing S13*a*.

Then, the VLAN configuration generation program 121 executes the VLAN configuration generation processing on the ring 34 that is connected with the base station in the same operation flow (S13*b*). In this case, the VLAN configuration generation program 121 gives the base station connection node identifier, the base station connection port number, and the allocation VLAN identifier to the argument of the VLAN configuration generation processing S13*b*.

Upon completing the processing on the two rings, the VLAN configuration generation program 121 completes the processing, and returns the processing to the calling source.

Figure 14:
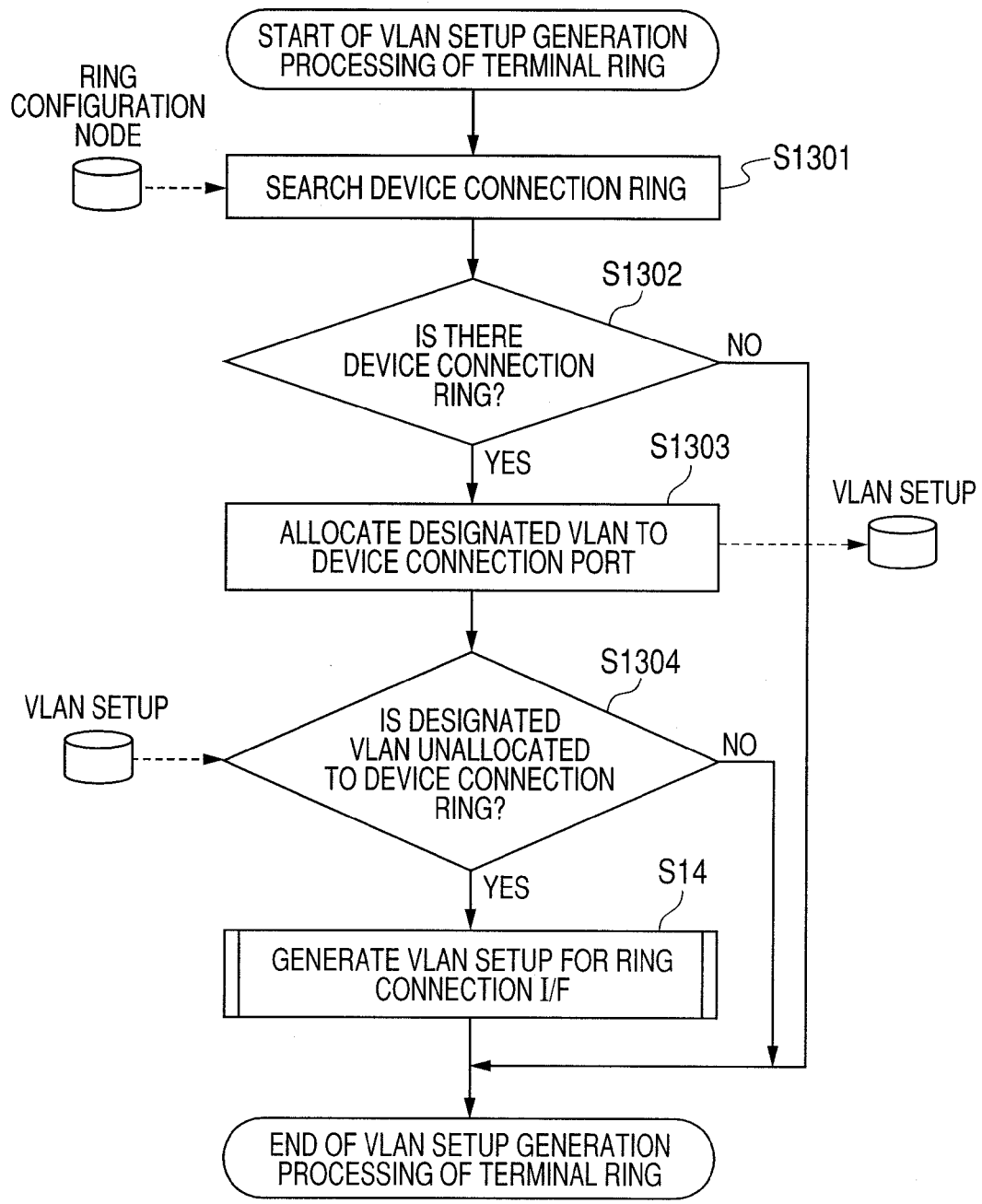
FIG. 14 is a flowchart illustrating an example of an operation flow of each of the rings of the VLAN configuration generation processing.

FIG. 14 shows the detailed operation flow of each of the rings in the VLAN configuration generation processing by the VLAN configuration generation program 121 which is represented by the flowchart of FIG. 13. In this example, this processing is called "VLAN configuration generation processing of the terminal ring". The operation flow of the gateway accommodation ring is common to that of the base station accommodation ring. For that reason, the flow of the processing will be described with reference to the same drawing.

The VLAN configuration generation processing of the terminal ring acquires the device connection node identifier, the device connection port identifier, and the allocation VLAN identifier as the argument during a calling time.

First, the VLAN configuration generation program 121 reads the ring node information 132, and searches the device connection ring (S1301, S1302). The device connection ring is represented as an entry in which a value at the row of the node identifier matches the device connection node identifier of the argument. The VLAN configuration generation program 121 acquires the ring ID of the pertinent device connection ring. When there is no entry satisfying the condition, the switch 7 that does not exist within the network, or the switch 7 that is not managed by the virtual network management server 1 is designated as the device connection target. For that reason, the VLAN configuration generation program 121 terminates the VLAN configuration generation processing of the terminal ring.

When the device connection ring is found, the VLAN configuration generation program 121 sets up the VLAN to the device connection port. The VLAN configuration generation program 121 updates the VLAN configuration, information

134 so as to connect a port P indicated by the device connection port identifier among all of the ports P of the switch 7 indicated by the device connection node identifier to the VLAN indicated by the allocation VLAN identifier (S1303). In the setup of the terminal ring that is connected with the gateway according to this embodiment, an entry in which the value at the row of the node is 1, the value at the row of the port is 2-1, the value at the row of the allocation VLAN is 40, and the type is "untagged" is added to the VLAN configuration information 134.

Then, the VLAN configuration generation program 121 checks whether the VLAN is unallocated to the switch 7 that is connected with the device, or not. In this example, the VLAN configuration generation program 121 checks whether the VLAN identifier 40 is unallocated to the ports P indicated by the port numbers 1-1 and 1-2 of the switch 7 indicated by the device connection node identifier, or not.

To achieve this, the VLAN configuration generation program 121 first searches two ports which are the ring connection I/F of the switch 7 that is connected with the device from the ring connection I/F information 133, and also searches two entries of the VLAN configuration corresponding to the searched two ports which are the ring connection I/F from the VLAN configuration information 134. Then, the VLAN configuration generation program 121 checks whether the designated allocation VLAN identifier is included at the row of the allocation VLAN of the searched two entries of the VLAN configuration, or not (S1304).

When a description will be given according to the acquired data, the VLAN configuration generation program 121 searches the ring connection I/F information 133 based on the device connection node identifier of the argument, and the ring ID acquired in Step S1302 to acquire the corresponding two port information. Also, the VLAN configuration generation program 121 specifies the pertinent entry with reference to the VLAN configuration information 134 based on the device connection node identifier and the acquired port information. Two entries are specified by the acquired two port information. The VLAN configuration generation program 121 checks whether the allocation VLAN identifier acquired by the argument is included in the VLAN identifier of each of the specified entries, or not.

When no specified allocation VLAN identifier is included, the VLAN configuration generation program 121 executes a process of setting the VLAN to the ring connection I/F of all the switches 7 configuring the ring with respect to the ring that accommodates the switch 7 of the device connection target (S14). In this situation, the VLAN configuration generation program 121 gives the ring identifier of the device connection ring, and the allocation VLAN identifier acquired as the argument at the time of starting the ring as the arguments of the ring connection I/F VLAN configuration generation processing S14.

When the allocation VLAN identifier that has been already designated is included, the VLAN configuration generation program 121 terminates the VLAN configuration generation processing of the terminal ring.

Figure 15:
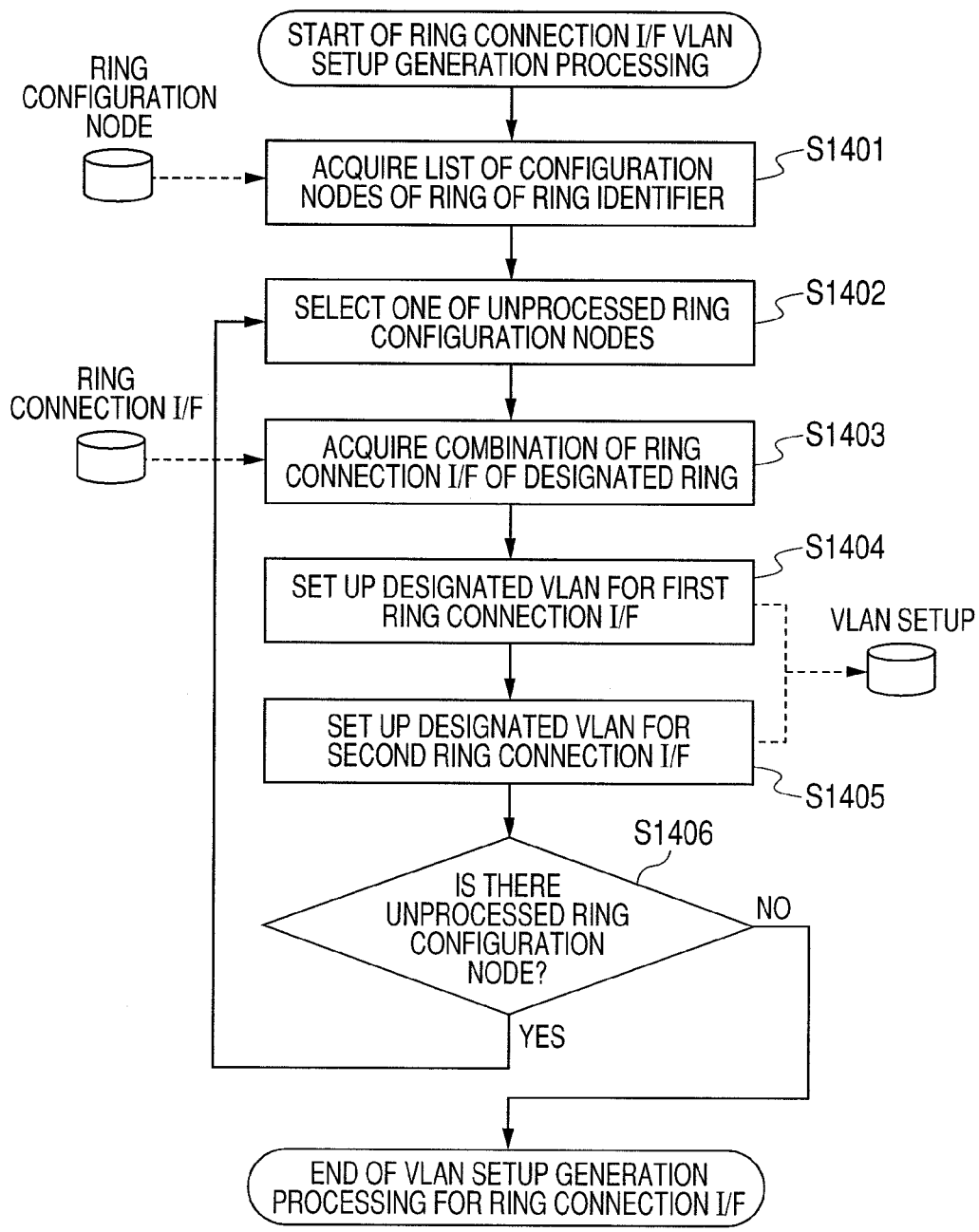
FIG. 15 is a flowchart illustrating an example of a detailed operation flow of the VLAN configuration processing to the ring connection I/F.

FIG. 15 exemplifies a flowchart of the detailed operation of the VLAN configuration processing S14 with respect to the ring connection I/F shown in FIG. 14.

This processing acquires the ring identifier of the device connection ring that is a VLAN configuration target, and the allocation VLAN identifier as the arguments at the time of calling.

The VLAN configuration generation program 121 first acquires a list of the switches 7 (node identifiers) that configure the specified ring (S1401). To achieve this, the VLAN configuration generation program 121 searches an entry in which the ring row matches the specified ring identifier among the entries of the ring node information 132. Then, the VLAN configuration generation program 121 acquires the value at the node row of the searched entry.

The VLAN configuration generation program 121 selects one switch 7 (node identifier) from the acquired list of the switches (S1402). The VLAN configuration generation program 121 acquires the combination of the ring connection I/F used for connecting the selected switch 7 to the specified ring, from the ring connection I/F information 133 (S1403). Then, the VLAN configuration generation program 121 updates the setup of the switch 7 so as to transmit or receive the frame of the specified VLAN by those ring connection I/F (S1404, S1405).

When a description will be given according to the acquired data, the VLAN configuration generation program 121 acquires the corresponding two port information with reference to the ring connection I/F information 133 based on the selected node identifier and the ring identifier of the device connection ring. The VLAN configuration generation program 121 instructs the switch 7 indicated by the node identifier to conduct the setup so as to set up the VLAN specified by the allocation VLAN identifier for each portion indicated by the acquired port information. Also, the VLAN configuration generation program 121 stores the allocation VLAN identifier at the rows of the selected node identifier and the VLAN identifier corresponding to the acquired port information with reference to the VLAN configuration information 134 with respect to each of the acquired two port information.

The VLAN configuration generation program 121 checks whether there is an unprocessed switch 7 in the list of the switches that configure the specified ring, which is acquired in Step S1401, or not (S1406).

When there is the unprocessed switch 7, the VLAN configuration generation program 121 executes the VLAN configuration processing to the above ring connection I/F with respect to that switch. When the processing of all the switches that configure the ring has been completed, the VLAN configuration generation program 121 terminates the VLAN configuration generation processing for the ring connection I/F, and returns the processing to the calling source.

Figure 16:
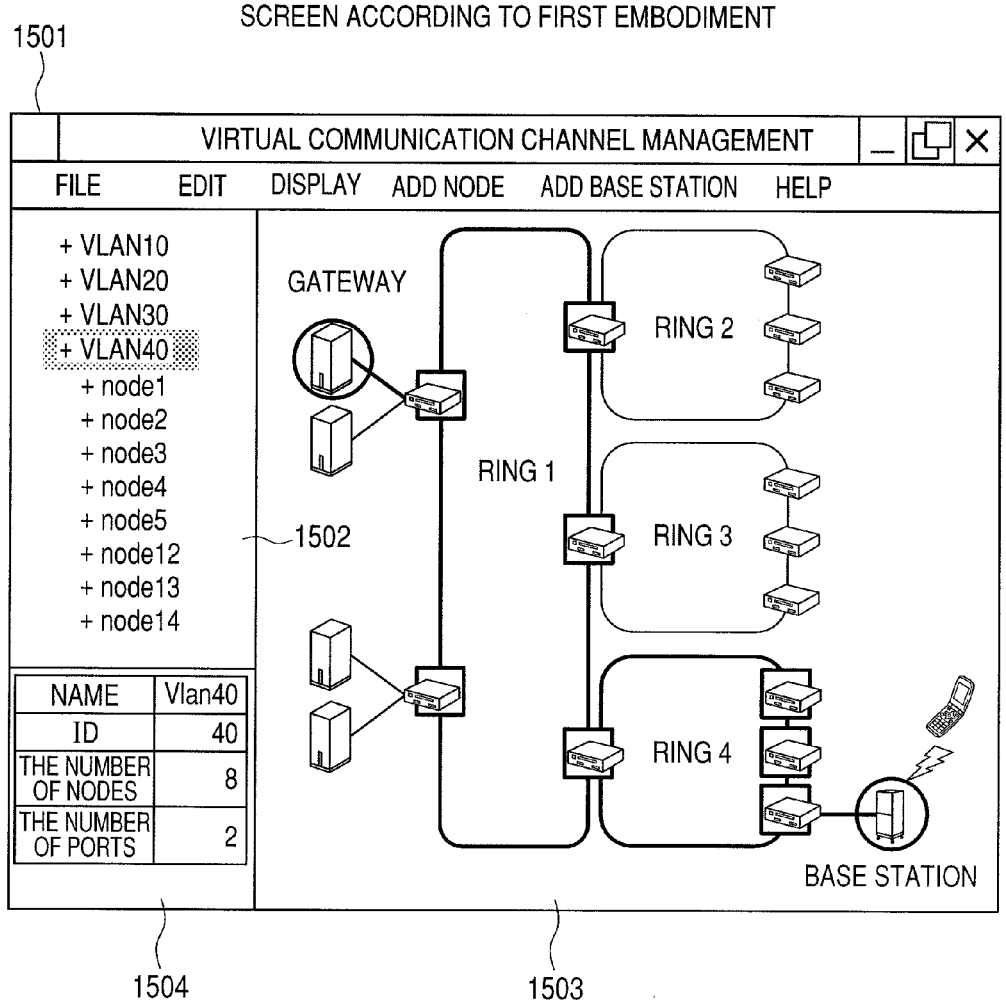
FIG. 16 is a diagram illustrating a display example of a setup result screen according to a first embodiment.

FIG. 16 shows a display example of the setup result screen used when the VLAN configuration display program 113 of the virtual network management server 1 according to this embodiment displays the setup result in Step S114 of FIG. 5.

A result display screen 1501 includes, for example, a network tree display region 1502, a network diagram display region 1503, and a VLAN information display region 1504.

In the network tree display region 1502 are displayed all of the VLAN identifiers included in the VLAN configuration information 134 on a line. The entry of each VLAN identifier includes a lower-order entry representative of the switch 7. In the lower-order entry is displayed a switch to which the VLAN identifier corresponding to any port is allocated. To achieve this, the VLAN configuration display program 113 creates a unique list of the VLAN identifiers from the row of the allocation VLANs of the VLAN configuration information 134, and displays the list in the network tree display region 1502. Also, the VLAN configuration display program 113 searches an entry corresponding to the row of the allocation VLAN among the entries of the VLAN configuration information 134 with respect to each of the VLAN identifiers. Then, the VLAN configuration display program 113 creates a unique combination of the node identifiers from the value of the node row of the searched entry, and displays the combination as the lower-order entry for each of the VLANs.

In the network diagram display region 1503 are displayed the rings, the gateway 4, the base station 5, and the switches 7, which configure the layer-2 network 3. The switches 7 to which the VLAN designated by the user is allocated, the links that are connected between the respective switches 7, and the link that is connected between those switches 7, and the gateway 4 or the base station 5, which is designated by the connection device, are highlighted. In this embodiment, the switches 701 to 705 and the switches 712 to 714 that configure the ring 31 and the ring 34, respectively, all of the links that configure the ring 31 and the ring 34, the link between the gateway 4a and the switch 701, and the link between the base station 5 and the switch 714 are highlighted.

In the VLAN display region 1504 are displayed, in a table format, a name of the designated VLAN, the VLAN identifier, the number of switches 7 accommodated in the designated VLAN, and the number of ports for connection with the gateway or the base station among the ports accommodated in the designated VLAN. To achieve this, the VLAN configuration display program 113 searches the entry that matches the VLAN of the VLAN configuration information 134. The VLAN configuration display program 113 extracts a unique combination of the node identifiers, and obtains the number of extracted node identifiers as the number of nodes. Also, the VLAN configuration display program 113 searches an entry that matches the VLAN identifier and whose type is "untagged", and sets its number as the number of ports.

Figure 17:
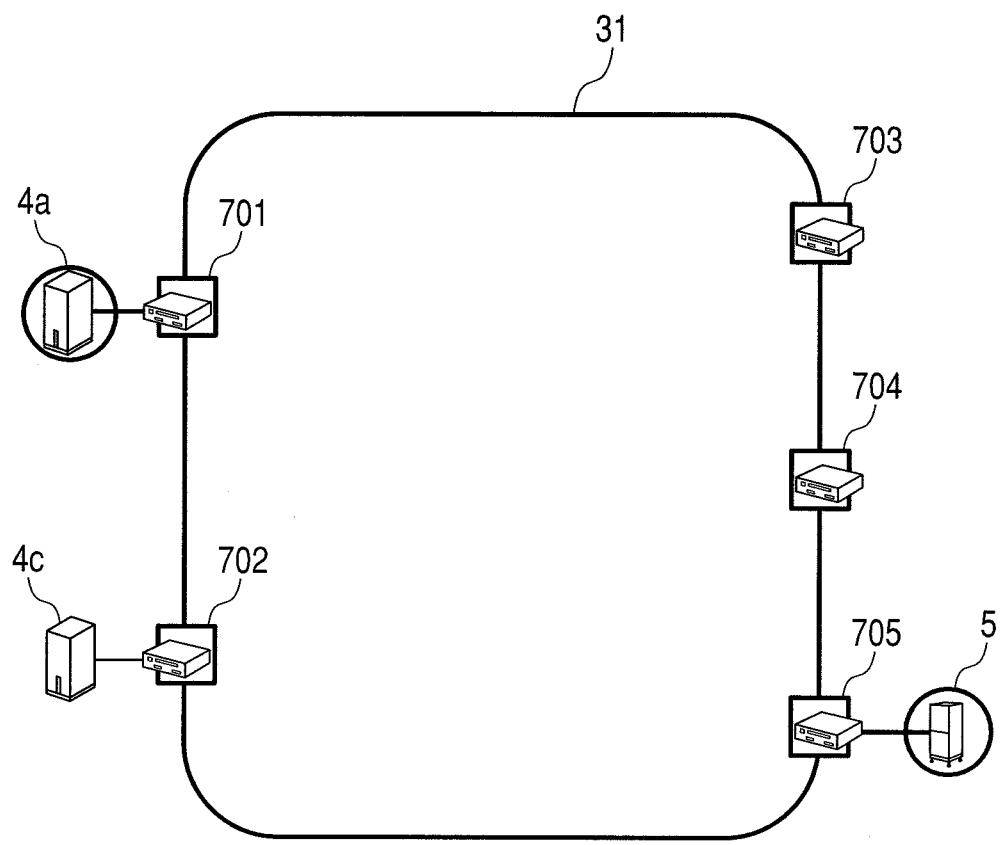
FIG. 17 is a diagram illustrating a network configuration of a single-stage ring network according to the first embodiment.

FIG. 17 shows an example of a network configuration to which the virtual network management server 1 according to the first embodiment can be applied.

In this example, the gateway 4 and the base station 5 are connected to the switch 701 and the switch 705, which configure the single ring 31, respectively. When the VLAN configuration processing is executed in the single-ring network, the virtual network management server 1 operates in the same manner as that of the above-mentioned two-stage ring network except for the VLAN configuration processing S13b of the terminal ring with respect to the base station in FIG. 13, and can create the virtual communication path between the gateway 4 and the base station 5.

A difference in the operation from the above-mentioned two-stage ring network resides in that the setup processing S14 of the ring connection I/F in FIG. 14 is not executed on the ring 31 when the VLAN configuration processing S13b of the terminal ring is executed. In the processing S1304 of determining whether the designation VLAN is allocated to the device connection ring which is in the operation flow, or not, it is determined that the designation VLAN has been already allocated. This is because the VLAN allocation of the ring 31 to the ring connection I/F has been completed at the time when the VLAN configuration generation processing S13a of the terminal ring that is connected with the gateway has been completed. For that reason, the processing is terminated without executing the ring connection I/F VLAN configuration generation processing S14.

According to this embodiment, for example, in the network configuration of the two-stage ring network shown in FIG. 2, and in the network configuration of the single-stage ring network shown in FIG. 1, the VLAN can be set up. As an example, in the two-stage configuration, the core node 31 can be used as a prefecture basis network, and the branch ring 34 and so on can be used as a municipality basis network.

Second Embodiment

Figure 18:
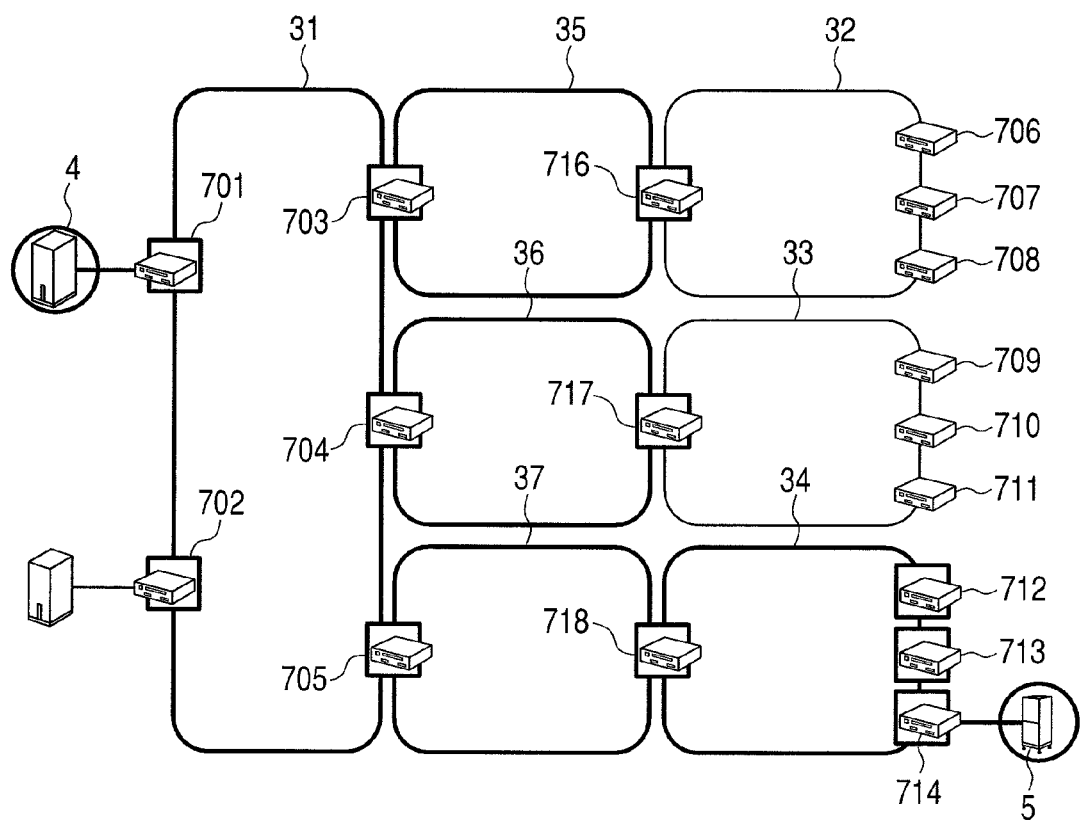
FIG. 18 is a diagram illustrating a network configuration of a three-stage ring network according to a second embodiment.

FIG. 18 shows a configuration of a network 3 according to a second embodiment of the present invention, and a VLAN allocation state in the network. This embodiment is different in the configuration of the network 3 from the first embodiment shown in FIG. 2. The network according to the second embodiment of the present invention is a network of a three-stage configuration, and routed through three-stage rings until reaching the base station from the gateway. It is assumed that in all of the gateway connection rings or the base station connection rings, rings to be routed through for reaching a different gateway connection ring or a different base station connection ring are uniquely determined. The number of ring stages can be four or more.

The links denoted by bold lines among the rings shown in FIG. 18 represent rinks to be subjected to VLAN configuration. The virtual network management server 1 according to this embodiment sets up the VLAN for creating a virtual communication path for the ring 31 that is connected with the gateway 4 and the ring 34 that is connected with the base station 5 among the rings that configure the network 3. Further, the virtual network management server 1 sets up the VLAN for relay rings that are not connected with the gateway or the base station.

The configuration of the virtual network management server 1 for setting up the VLAN for the network including such relay rings is substantially identical with the configuration of the virtual network management server 1 according to the first embodiment.

The virtual network management server 1 according to the second embodiment additionally includes a ring type registration program 115, a relay ring VLAN configuration generation program 122, and ring type information 135 in the virtual network management server 1 according to the first embodiment. A description will be given of the configuration of the virtual network management server 1, mainly, those components different from the first embodiment.

Figure 19:
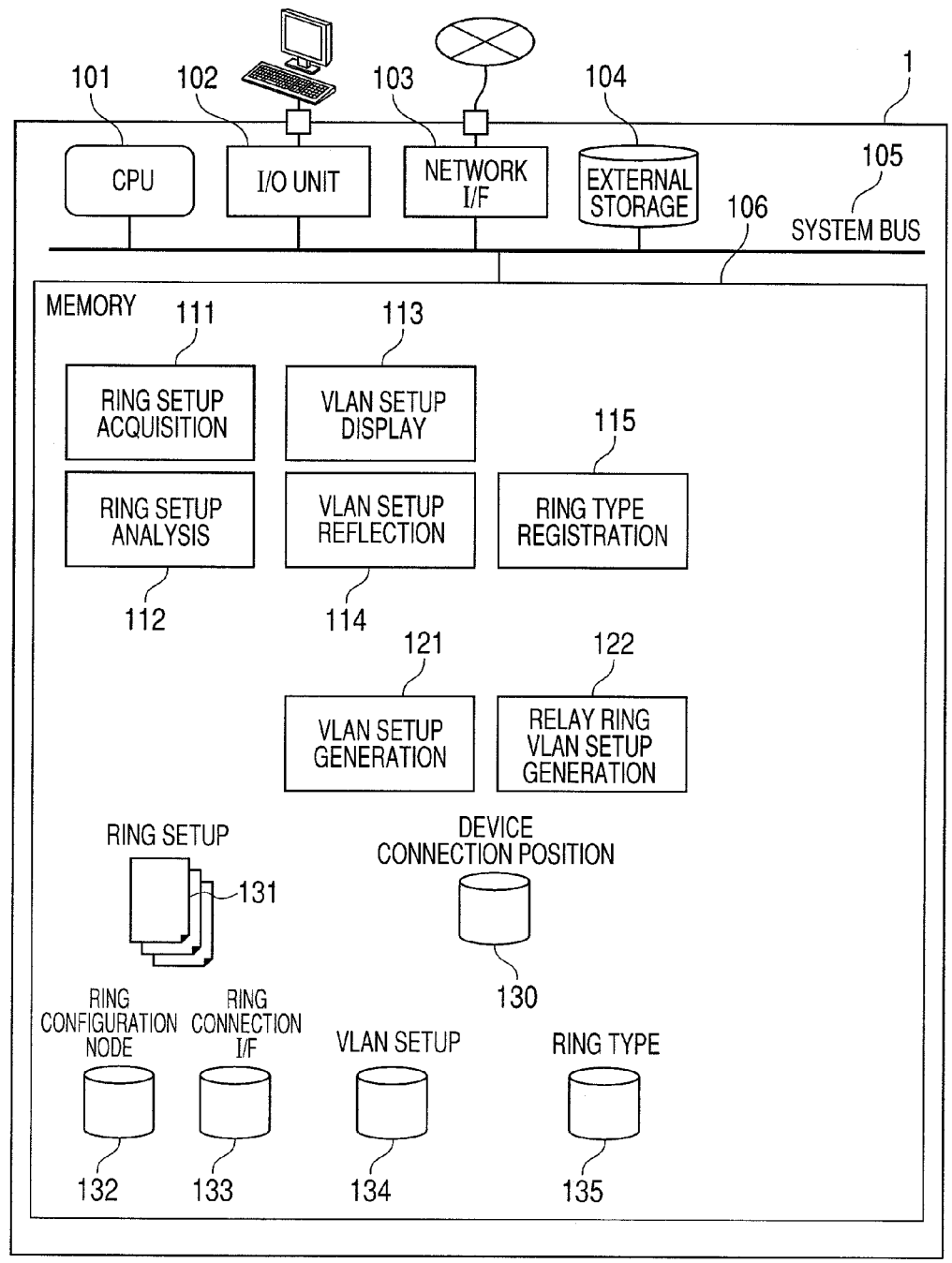
FIG. 19 is a diagram illustrating a virtual network management server according to the second embodiment.

FIG. 19 shows a configuration example of the virtual network management server 1 according to the second embodiment of the present invention. The configuration of the virtual network management server 1 is largely common to the configuration of the virtual network management server 1 in the first embodiment of the present invention shown in FIG. 3. For that reason, the different configurations will be mainly described.

The virtual network management server 1 according to the second embodiment reads the ring type registration program 115 on the memory 106, and executes the program 115 in addition to the configuration of the virtual network management server 1 according to the first embodiment. Also, the virtual network management server 1 reads the relay ring VLAN configuration generation program 122 on the memory 106, and executes the program 122. Also, the virtual network management server 1 includes the ring type information 135 to be used by the program 122 on the memory 106.

Figure 20:
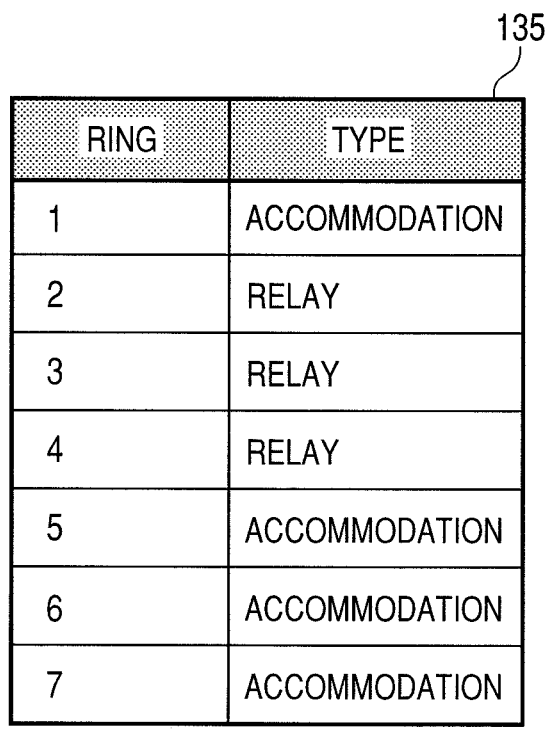
FIG. 20 is a diagram illustrating a configuration example of ring type information.

FIG. 20 shows a configuration example of the ring type information 135 provided in the virtual network management server 1 according to the second embodiment of the present invention. The ring type information 135 is represented by a table having the combination of the ring identifier and the identifier representative of the type of the ring as one entry. The types of the ring are "accommodation" and "relay". In those types, the accommodation is a type representative of a ring that is connected with the gateway 4 or a ring that is connected with the base station 5. The relay is a type representative of all the rings whose type is not accommodation among the rings that configure the network 3.

Figure 21:
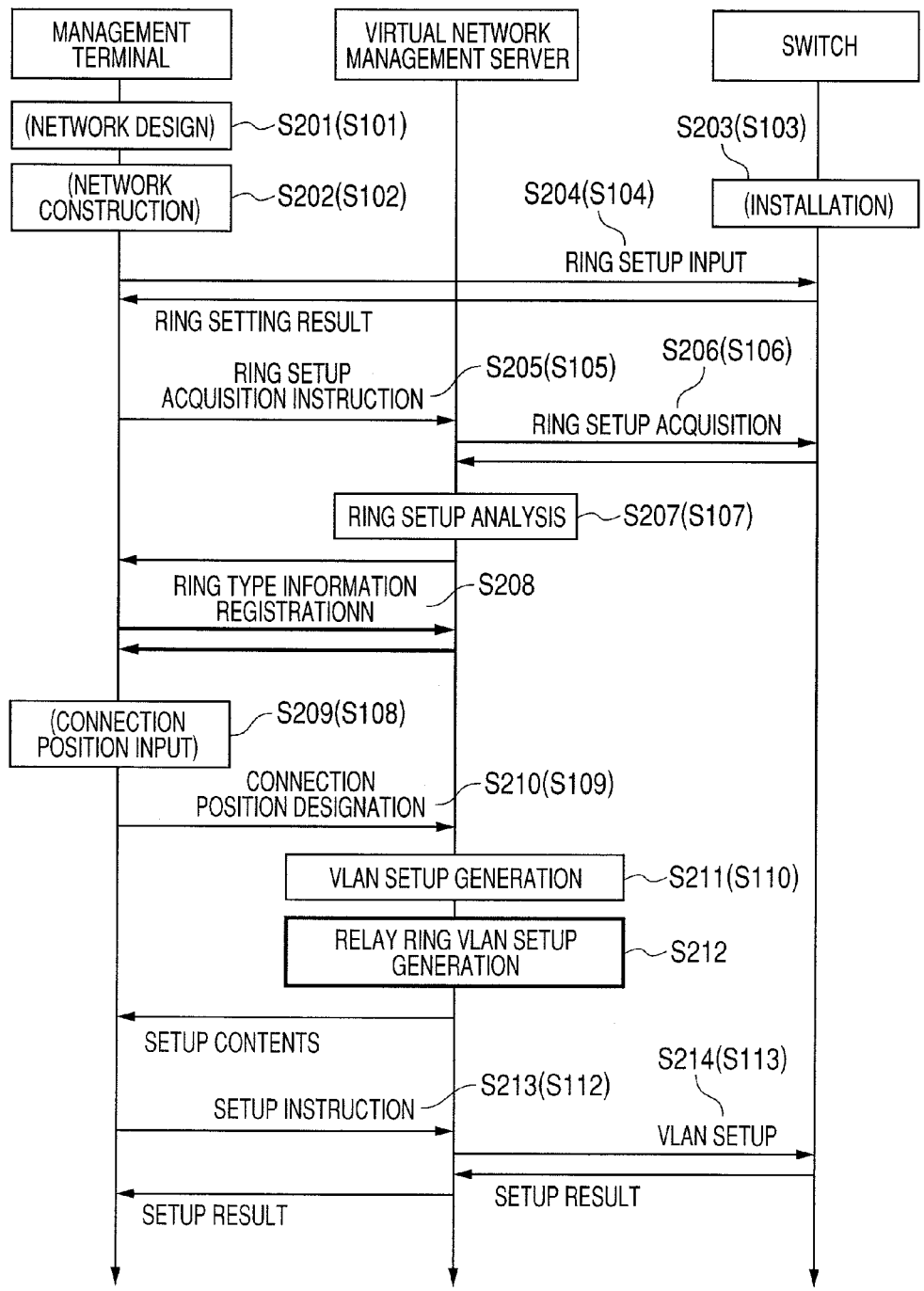
FIG. 21 is a diagram illustrating an example of a VLAN configuration sequence according to the second embodiment.

FIG. 21 shows a business sequence when the virtual network management server 1 sets up the VLAN for the virtual communication path for the network 3 according to the second embodiment of the present invention. This sequence is identical with the sequence shown in FIG. 5 according to the first embodiment of the present invention except for a part thereof. Therefore, the same processing as that in the first embodiment is denoted by corresponding symbols, and their description will be omitted. A description will be given of the contents of the sequence, mainly, parts different from the first embodiment.

As in the first embodiment, when the manager constructs the network 3 based on the design result (S201, S202, S203), the management terminal inputs the ring configuration to each of the switches 7 (S204). Then, the management terminal instructs the virtual network management server 1 to acquire the ring configuration (S205). The virtual network management server 1 acquires the ring configuration from each of the switches 7 within the network 3, analyzes the ring configuration, and generates the ring node information 132 and the ring connection I/F information 133 (S206, S207).

After the virtual network management server 1 has completely analyzed the ring configuration, the management terminal registers the ring type information in the virtual network management server 1 (S208). The virtual network management server 1 creates the ring type information 135 based on the input information.

Upon registration of the ring type information, the manager determines the connection positions of the gateway 4 and the base station 5 (S209), and the management terminal indicates the connection positions to the virtual network management server 1 (S210). The virtual network management server 1 generates the VLAN configuration as in the VLAN configuration generation processing S110 of the first embodiment (S211). In this case, the virtual network management server 1 sets up the VLAN for only the gateway connection ring 31 and the base station connection ring 34 among the rings that configure the network 3.

Then, the virtual network management server 1 sets up the designation VLAN for the rings whose type is relay (S212), and displays the setup contents on a screen of the management terminal. In this embodiment, the virtual network management server 1 sets up the VLAN for the rings 35 to 37. The manager confirms whether any program arises on the setup contents, or not, and if there is no problem, the management terminal instructs the virtual network management server 1 to reflect the setup through the operation of the manager (S213). Upon receiving an instruction of the setup from the manager, the virtual network management server 1 reflects the VLAN configuration to the pertinent switch 7 (S214).

Figure 22:
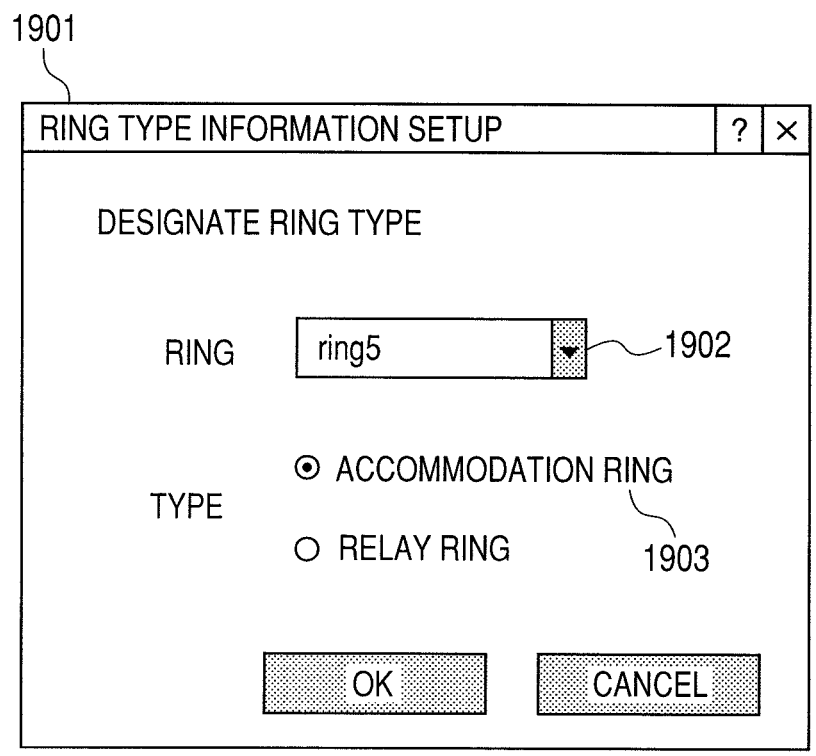
FIG. 22 is a diagram illustrating a configuration example of a ring type information setup screen.

FIG. 22 shows a configuration example of a ring type information setup screen 1901 which is displayed by the ring type registration program 115 of the virtual network management server 1, for designating the type of the ring by the manager in the sequence S208 according to the second embodiment of the present invention. The ring type information setup screen 1901 includes a ring select box 1902 and a ring type designation button 1903. The ring type designation button 1903 displays an accommodation ring and a relay ring as options.

The ring type registration program 115 allows the ring type information setup screen 1901 to be displayed on the screen of the management terminal, and updates the pertinent entry of the ring type information 135 according to the ring identifier and the ring type which are designated by the ring type information setup screen 1901. When there is no pertinent entry in the ring type information 135, the ring type registration program 115 newly creates an entry.

Figure 23:
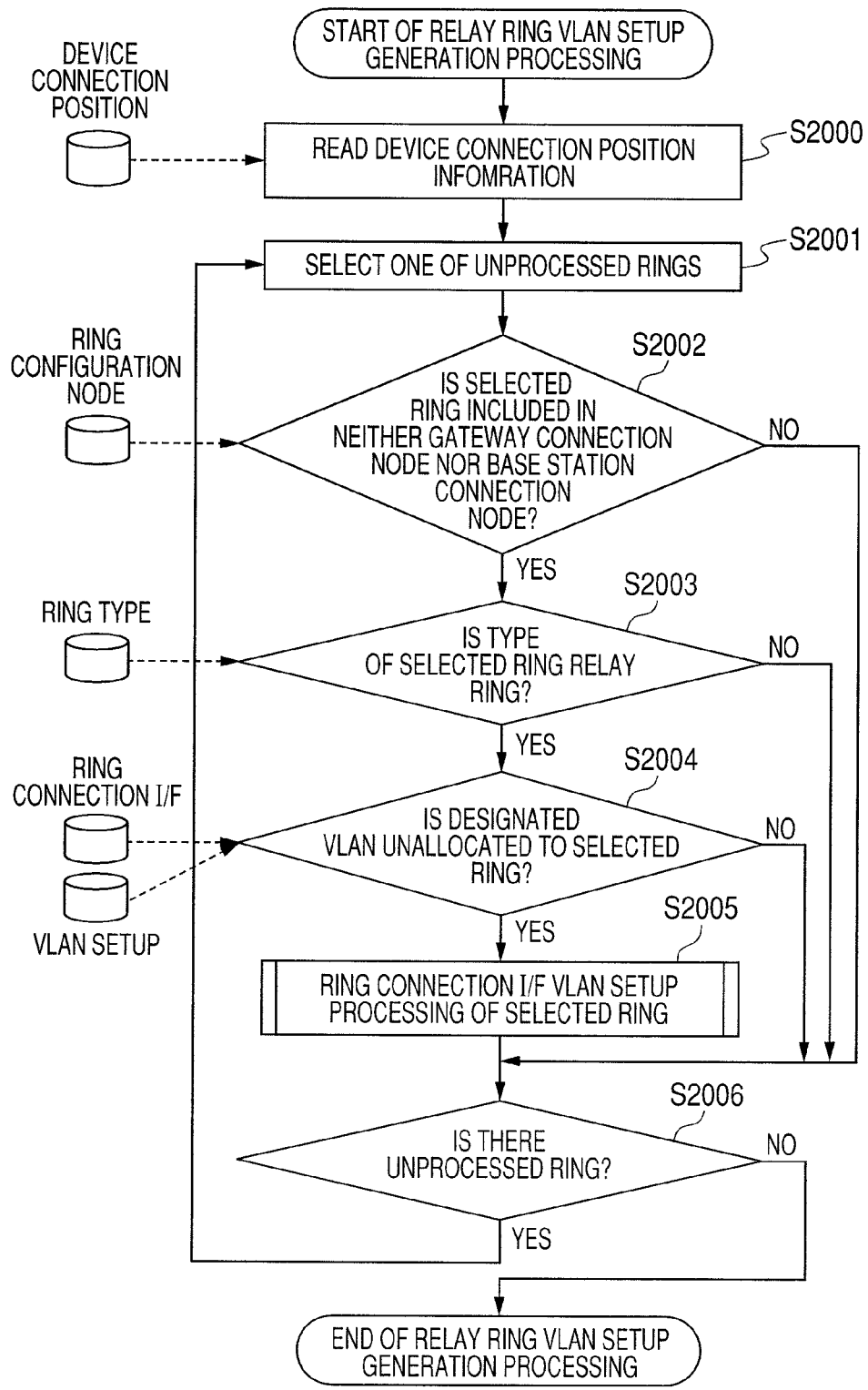
FIG. 23 is a flowchart illustrating an example of an operation flow of a relay ring VLAN configuration program.

FIG. 23 exemplifies a flowchart showing a VLAN configuration processing flow for the relay ring by the relay ring VLAN configuration generation program 122 of the virtual network management server 1 according to the second embodiment of the present invention. The virtual network management server 1 sets up the VLAN for the relay ring in a sequence S212 according to the operation flow.

The relay ring VLAN configuration generation program 122 first reads the device connection position information 130, and acquires the allocation VLAN identifier, the gateway connection node identifier, the gateway connection port number, the base station connection node identifier, and the base station connection port number.

Then, the relay ring VLAN configuration generation program 122 selects one ring from all of the rings within the network (S2001). Then, the relay ring VLAN configuration generation program 122 checks whether the selected ring includes the gateway connection ring or the base station connection ring, or not (S2002). To achieve this, the relay ring VLAN configuration generation program 122 selects an entry that matches the ring identifier from the ring node information 132, and acquires a list of the node row. Then, the relay ring VLAN configuration generation program 122 checks whether the input gateway connection node identifier or the input base station connection node identifier is included in the acquired list, or not. When any identifier is included in the acquired list, the relay ring VLAN configuration generation program 122 stops the processing of the selected ring, and shifts to the processing of an unprocessed another ring.

When no identifier is included in the acquired list, the relay ring VLAN configuration generation program 122 checks whether the type of the selected ring is a relay ring, or not (S2003). To achieve this, the relay ring VLAN configuration generation program 122 searches the pertinent entry of the ring type information 135, and when a value of the type row is "relay", the relay ring VLAN configuration generation program 122 determines that the selected ring is the relay ring.

When the relay ring VLAN configuration generation program 122 determines that the selected ring is the relay ring, the relay ring VLAN configuration generation program 122 checks whether the designated VLAN has been allocated to the selected ring, or not (S2004). To achieve this, the relay ring VLAN configuration generation program 122 searches an entry corresponding to the ring identifier of the ring connection I/F information 133, and obtains a node of the selected ring, and the ring connection I/F at that node. Then, the relay ring VLAN configuration generation program 122 checks whether the designated VLAN has been allocated in correspondence with that node and the ring connection I/F, or not, by using the VLAN configuration information 134.

When the designated VLAN has not been allocated to the ring connection I/F of the node of the selected ring, the relay ring VLAN configuration generation program 122 sets up the designated VLAN for all of the ring connection I/F of the selected ring (S2005). In this case, the relay ring VLAN configuration generation program 122 sets up the VLAN according to the same flow as that when the VLAN is set up to the ring connection I/F in the first embodiment of the present invention. More specifically, the relay ring VLAN configuration generation program 122 sets up the VLAN according to the ring connection I/F VLAN configuration generation processing flow shown in FIG. 15. In this example, the ring identifier of the selected ring and the allocation VLAN identifier are given as the arguments.

When it is determined that the type of the selected ring is not the relay ring in Sequence S2003, or it is determined that the designated VLAN has been already allocated to the designated to the selected ring in Sequence S2004, in the relay ring VLAN configuration generation processing, the VLAN configuration processing in Sequence S2005 is not required. Therefore, Sequence S2005 is omitted.

The relay ring VLAN configuration generation program 122 finally checks whether there is an unprocessed ring within the network, or not (S2006). When the unprocessed ring remains, the relay ring VLAN configuration generation program 122 returns to Step S2001, and repeats the same processing. When the processing of all the rings has been completed, the relay ring VLAN configuration generation program 122 terminates the relay ring VLAN configuration generation processing, and returns the processing to the calling source.

Figure 24:
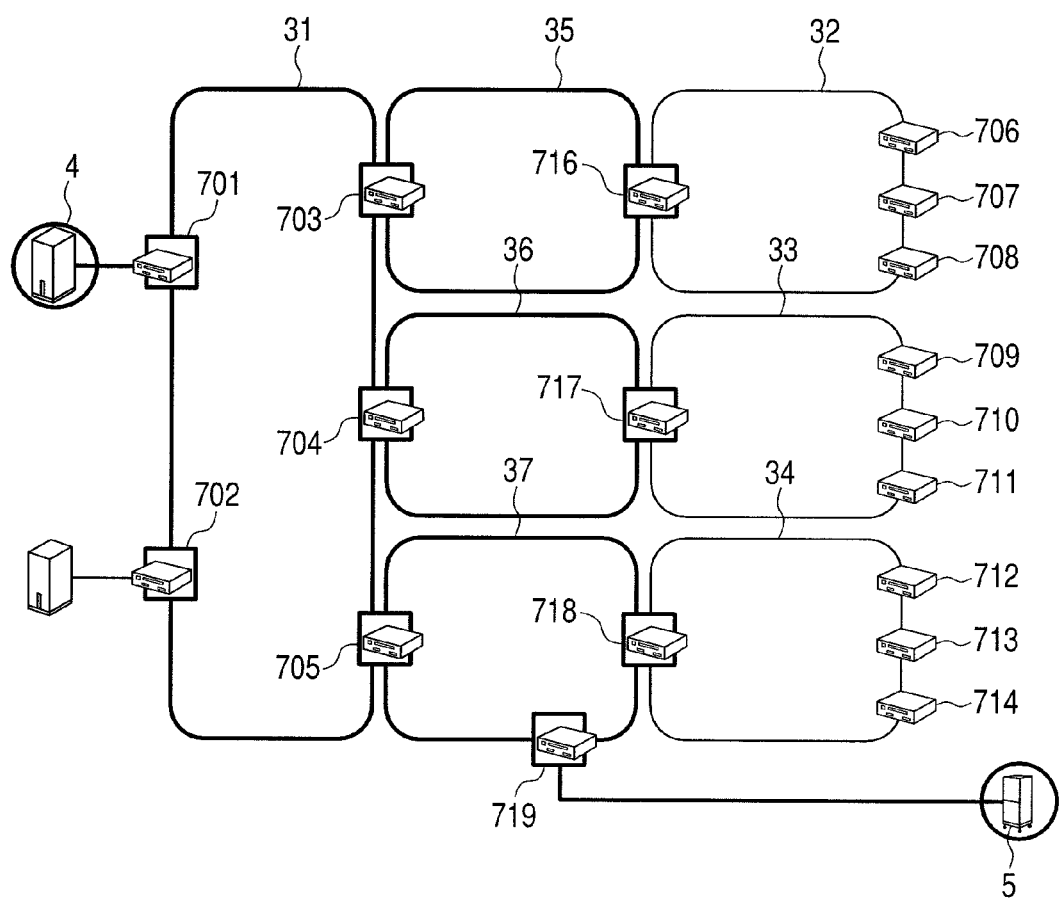
FIG. 24 is a diagram illustrating an example of a network configuration of a three-stage ring network.

FIG. 24 shows another example of the configuration of the network in which the virtual network management server according to the second embodiment can execute the VLAN configuration processing. This configuration example is different from the network shown in FIG. 18 in that a switch 719 that is connected with the base station 5 is a switch that configures the relay ring. When the virtual network management server 1 according to the second embodiment executes the VLAN configuration along the VLAN configuration sequence of FIG. 21, the designated VLAN is allocated to the gateway connection port of the switch 701, the base station connection port of the switch 719, and all of the ring connection I/F of the rings 35 to 37 to create a virtual communication path between the gateway 4 and the base station 5.

The operation of the virtual network management server 1 when the creation of the virtual communication path between the gateway and the base station in this network configuration is instructed is partially different in the operation of the relay ring VLAN configuration generation processing S212 from that in the network configuration shown in FIG. 18.

In the network configuration of FIG. 24, the ring 37 is connected with the base station 5. For that reason, in the VLAN configuration generation processing S211 of FIG. 21, the VLAN information 134 is updated in such a manner that the VLAN is allocated to all of the ring connection I/F of all the nodes that configure the ring 37.

When the relay ring VLAN configuration generation processing S212 of FIG. 23 is executed, unlike the configuration of the network of FIG. 18, when the ring 37 is selected, the result "N" is selected in Step S2002 for determining whether the selected ring includes neither the gateway connection node nor the base station connection node, or not. For that reason, when the ring 37 is selected, the ring connection I/F VLAN Configuration processing S2005 of the selected ring is not executed when the ring 37 is selected.

According to this embodiment, for example, in the network configuration of the three-stage ring network as shown in FIG. 18, a multistage ring network of four or more states, and the network configuration in which the base station is connected to the relay ring as shown in FIG. 24, the VLAN can be set up.

Third Embodiment

Figure 25:
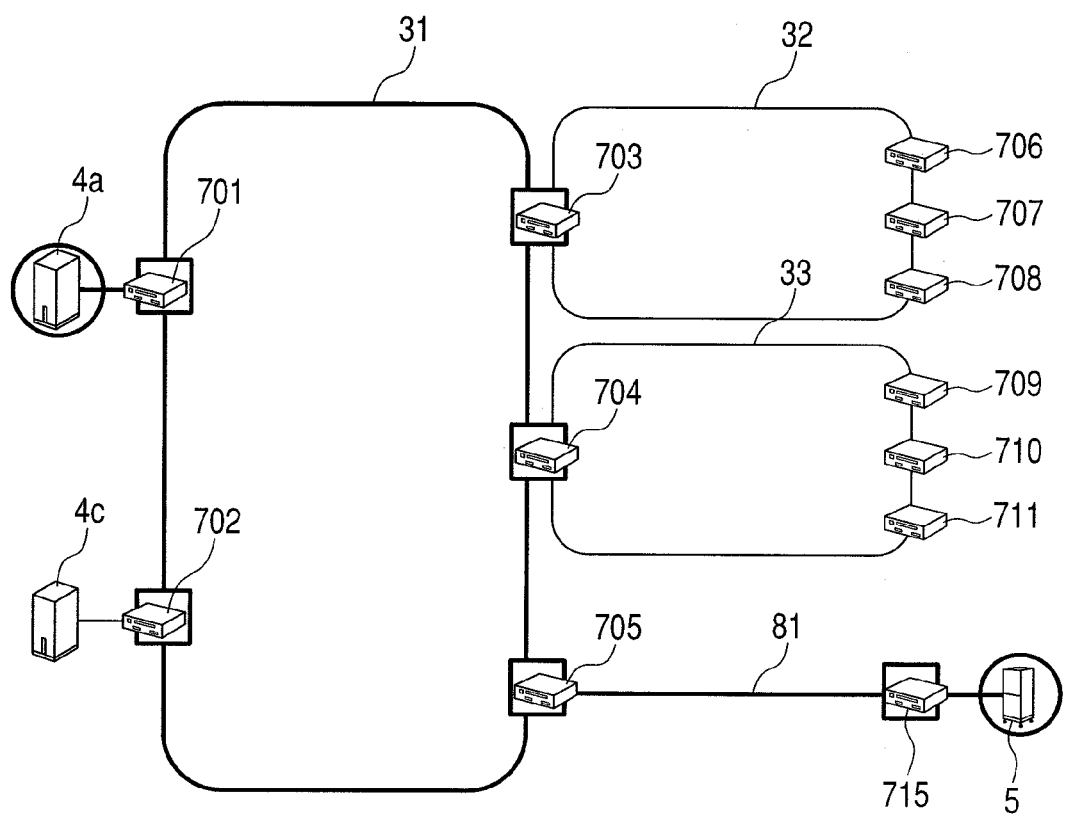
FIG. 25 is a diagram illustrating an example of a network configuration of a two-stage hybrid ring network according to a third embodiment.

FIG. 25 shows a configuration example of a network according to a third embodiment of the present invention. The third embodiment of the present invention is applied to a network in which a part of the rings is replaced with a link for direct connection between the switches 7 in the first embodiment. In this embodiment, the network includes the ring 31, the ring 32, and the ring 33. The ring 31 is configured by, for example, the switches 701 to 705. The ring 32 is connected to the ring 31 through the switch 703, and the ring 33 is connected to the ring 31 through the switch 704. The switch 705 that configures the ring 31 and the switch 715 which accommodates the base station 5 are connected directly to each other by a link 81.

This directly connected link 81 is used, for example, for connection to an area far from the ring 31 of the connection source, and overhung from the connection source ring 31 to construct the network. Therefore, the link is called "pier link". The network including such an pier link requires a new configuration for managing the configuration of the pier link in the virtual network management server 1.

The links indicated by bold lines in FIG. 25 represent links which need to be subjected to the VLAN configuration for creating the virtual communication path that connects the gateway 4 and the base station 5. Also, the switches 7 each surrounded by a box indicated by a bold line in FIG. 25 represent switches 7 that need to be subjected to the VLAN configuration, likewise. In this example, the link that configures the ring 31, the pier link 81, the switches 701 to 705, and the switch 715 are VLAN configuration targets.

The configuration of the virtual network management server 1 for creating the virtual communication path in the network including the pier link is substantially identical with the configuration of the virtual network management server 1 of the first embodiment. Hereinafter, the configuration of the virtual network management server 1, mainly, parts different from the configuration in the first embodiment will be described.

In the third embodiment, the virtual network management server 1 additionally includes an pier link registration program 116, an pier link VLAN configuration generation program 123, and pier link information 136.

Figure 26:
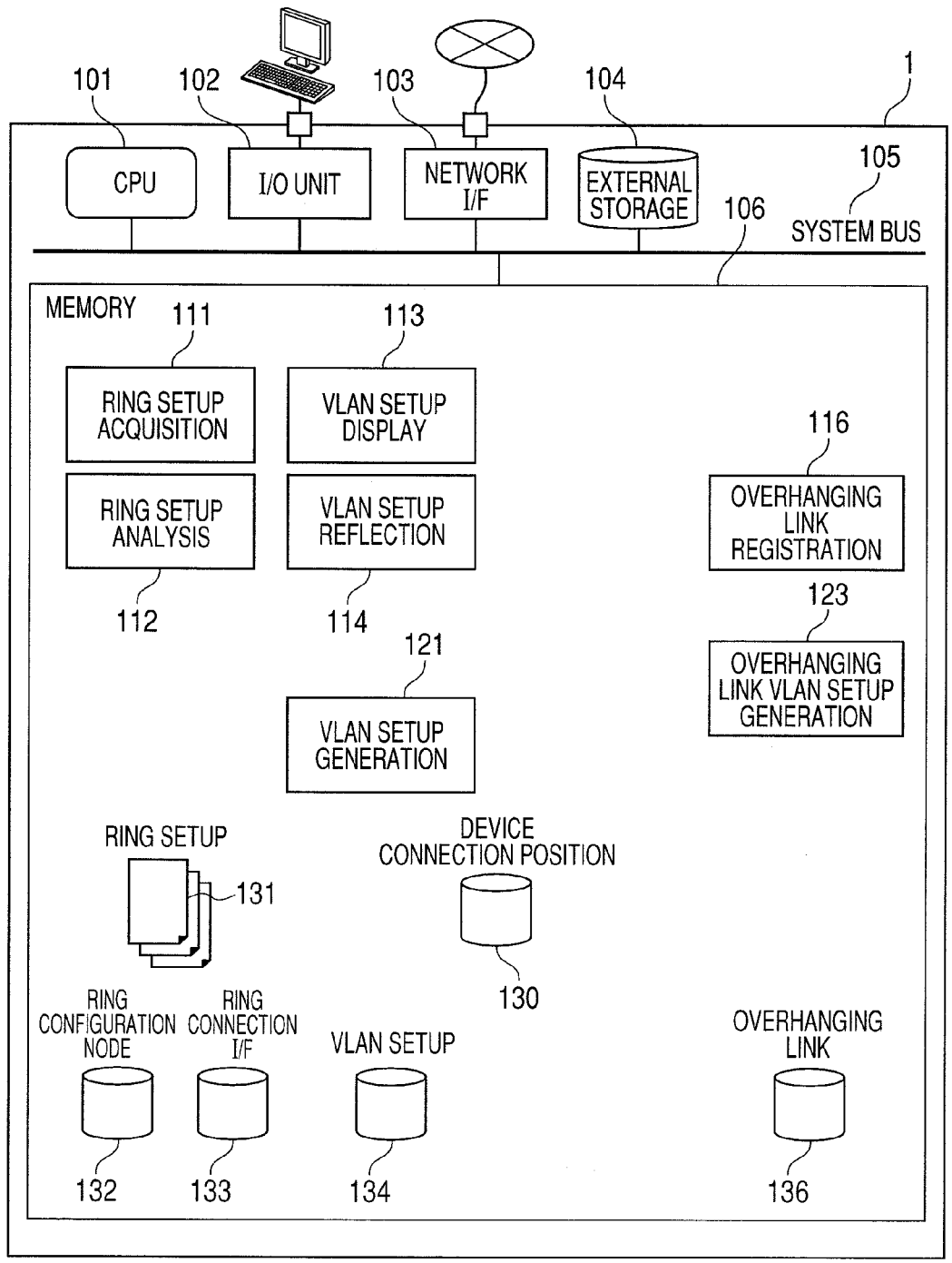
FIG. 26 is a diagram illustrating a configuration example of a virtual network management server according to the third embodiment.

FIG. 26 shows a configuration example of the virtual network management server 1 according to the third embodiment of the present invention. The configuration according to the third embodiment is largely common to the configuration of the virtual network management server 1 in the first embodiment of the present invention. For that reason, the different configurations will be mainly described.

The virtual network management server 1 according to the third embodiment reads the pier link registration program 116 on the memory 106, and executes the program 116 in addition to the configuration of the virtual network management server 1 of the first embodiment. Also, the virtual network management server 1 reads the pier link VLAN configuration generation program 123 on the memory 106, and executes the program 123. Also, the memory 106 includes the pier link information 136 to be used by the program 123.

FIG. 27 shows a configuration example of the pier link information 136 provided in the virtual network management server 1 according to the third embodiment. The pier link information 136 is represented by a table having, as one entry, the combination of an identifier 1361 for uniquely identifying the pier link within the network, an identifier 1362 and a port identifier 1363 of one switch 7 of the pier link, and an identifier 1364 and a port identifier 1365 of the other switch 7.

In this embodiment, it is assumed that the identifier 1361 of the link 81 is 1, the identifier 1362 of the switch 705 connected to one end of the link 81 is 5, and the identifier 1363 of the pier link connection port is 2-1. Also, it is assumed that the identifier 1364 of the switch 715 connected to the other end of the link 81 is 15, and the port identifier 1365 of the pier link connection port is 1-24.

Figure 28:
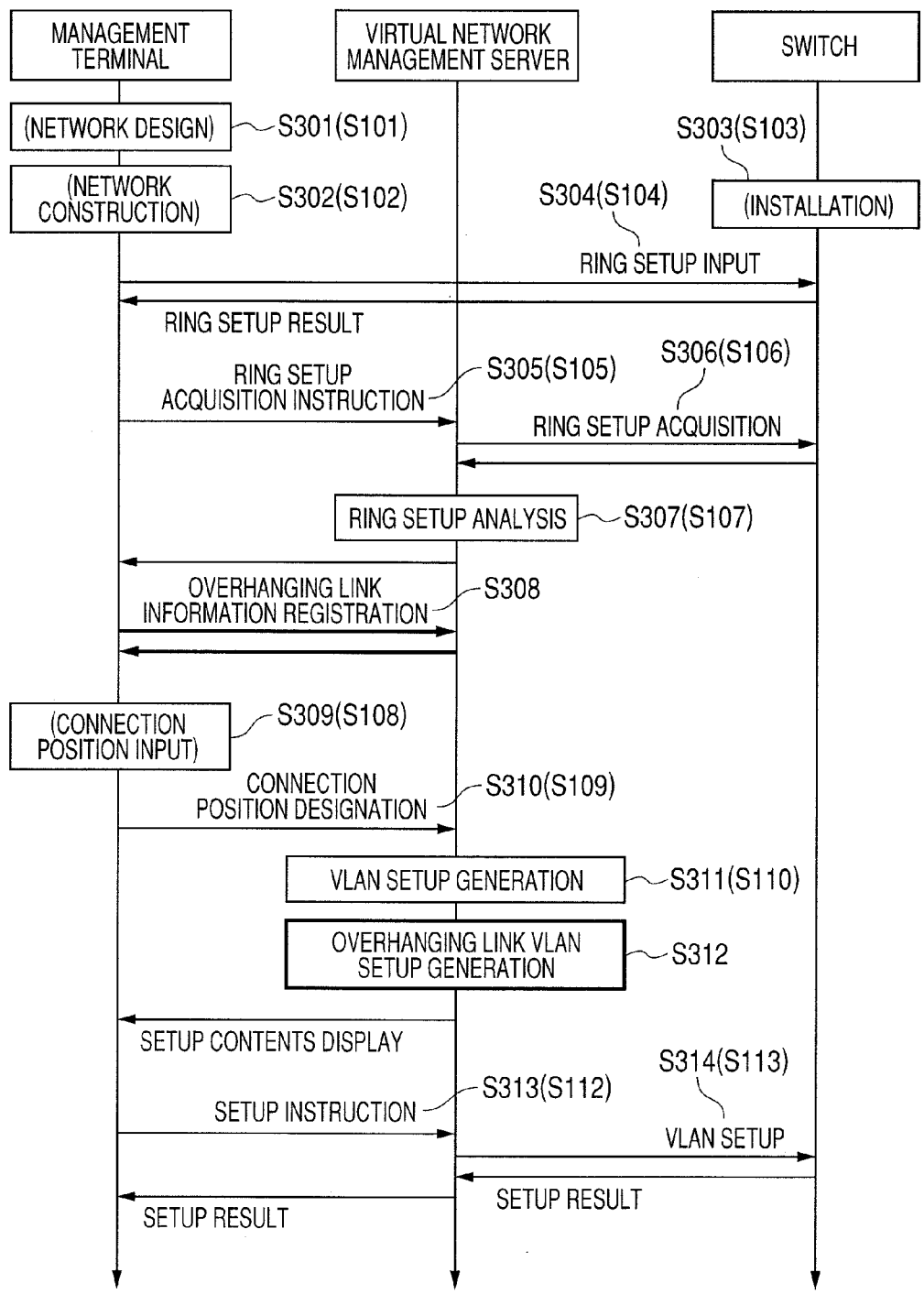
FIG. 28 is a diagram illustrating an example of a VLAN configuration sequence according to the third embodiment.

FIG. 28 exemplifies a sequence diagram of business for setting up the VLAN in order that the manager creates a virtual communication path between the gateway and the base station according to the third embodiment of the present invention. The sequence diagram is identical with the sequence of the first embodiment shown in FIG. 5 except for a part where the VLAN is set up to the pier link. For that reason, the same processing as that in the first embodiment is denoted by identical symbols, and their description will be omitted. The flow mainly including parts different from the sequence in the first embodiment will be described.

As in the first embodiment, when the manager constructs the network 3 based on the design result (S301, S302, S303), the management terminal inputs the ring configuration for each of the switches 7 (S304). Then, the management terminal instructs the virtual network management server 1 to acquire the ring configuration (S305). The virtual network management server 1 acquires the ring configuration from each of the switches within the network 3, analyzes the ring configuration, and generates the ring node information 132 and the ring connection I/F information 133 (S306, S307).

When the virtual network management server 1 has completed the analysis of the ring configuration, the management terminal registers information on the pier link in the virtual network management server 1 through GUI (S308). The virtual network management server 1 creates the pier link information 136 according to the contents registered by the management terminal through the operation of the manager.

After having registered the pier link, the manager determines the connection positions of the gateway 4 and the base station 5 (S309), and the management terminal indicates the connection positions to the virtual network management server 1 for instructing the VLAN configuration thereto (S310). The virtual network management server 1 generates the VLAN configuration of a ring that is connected with the gateway 4 according to the ring node information 132 generated in Sequence S307, the ring connection I/F information 133, and the connection position designated in Sequence S310 as in the first embodiment (S311).

In the third embodiment, the pier link 81 is connected with the base station 5. For that reason; the virtual network management server 1 generates the VLAN configuration of the pier link 81 based on the pier link information 136 input by the manager (S312). The processing will be described in detail later.

Upon completion of the VLAN configuration generation (S311) and the pier link VLAN configuration generation (S312), the virtual network management server 1 displays the VLAN configuration contents for the gateway connection ring and the pier link on a screen of the management terminal.

The manager confirms whether any problem arises on the VLAN configuration generated by the virtual network management server 1, or not. If there is no problem, the management terminal instructs the virtual network management server 1 to conduct the VLAN configuration through the operation of the manager (S313). Upon receiving the instruction from the manager, the virtual network management server 1 sets up the VLAN to the switch 7 to be set up (S314), and displays the setup result on the screen.

Figure 29:
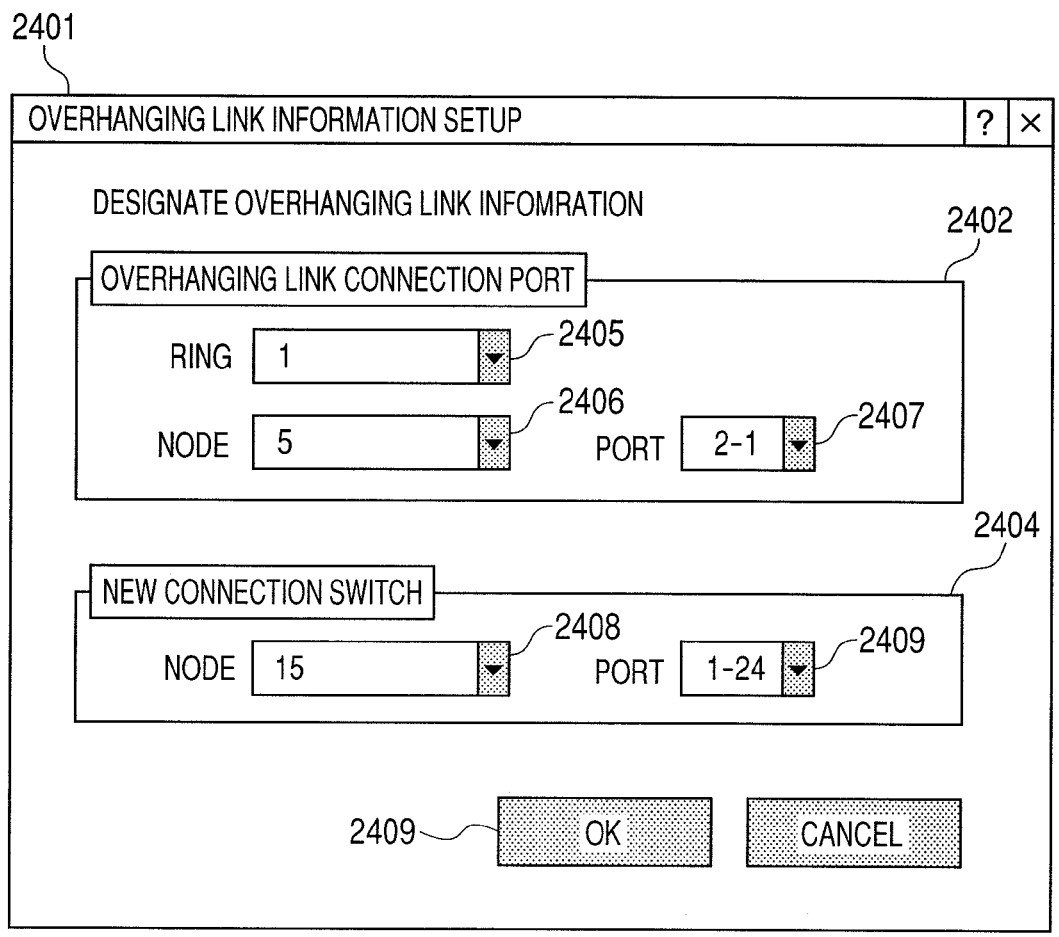
FIG. 29 is a diagram illustrating a configuration example of an pier link information setup screen according to the third embodiment.

FIG. 29 shows a configuration example of an pier link information setup screen, which is displayed on the screen by the pier link registration program of the virtual network management server 1 through the manager according to the third embodiment of the present invention. The manager uses this screen in the pier link information registration work (S308) within the VLAN configuration business sequence, and registers the information on the pier link 81 in the virtual network management server 1.

An pier link information setup screen 2401 includes an pier link connection port input area 2402 the designates the pier link connection port of the connection target ling, and a new connection switch input area 2403 that designates a switch to be connected to an end of the pier link. The pier link connection port input area 2402 includes a ring designation box 2405, a node designation box 2406, and a port designation box 2407. When the ring is designated by the ring designation box 2405, the node designation box 2406 limits available choices of the pull-down box to the configuration node of the selected node. Also, the new connection switch input area 2403 includes a node designation box 2408 and a port designation box 2409.

The virtual network management server 1 creates the pier link information 136 by using the information designated on the pier link information setup screen 2401. More specifically, the virtual network management server 1 allocates the identifier 1361 of the pier link to each registration of the pier link by the pier link information setup screen 2401 in the order from 1. Also, it is assumed that the respective node identifiers and the respective port identifiers which are designated by the node designation box 2406, the port designation box 2407, the node designation box 2408, and the port designation box 2409 in the pier link information setup screen 2401 are a node identifier 1362, a port identifier 1363, anode identifier 1364, and a port identifier 1365. The virtual network management server 1 creates one entry of the pier link information 136 from those pieces of information.

Figure 30:
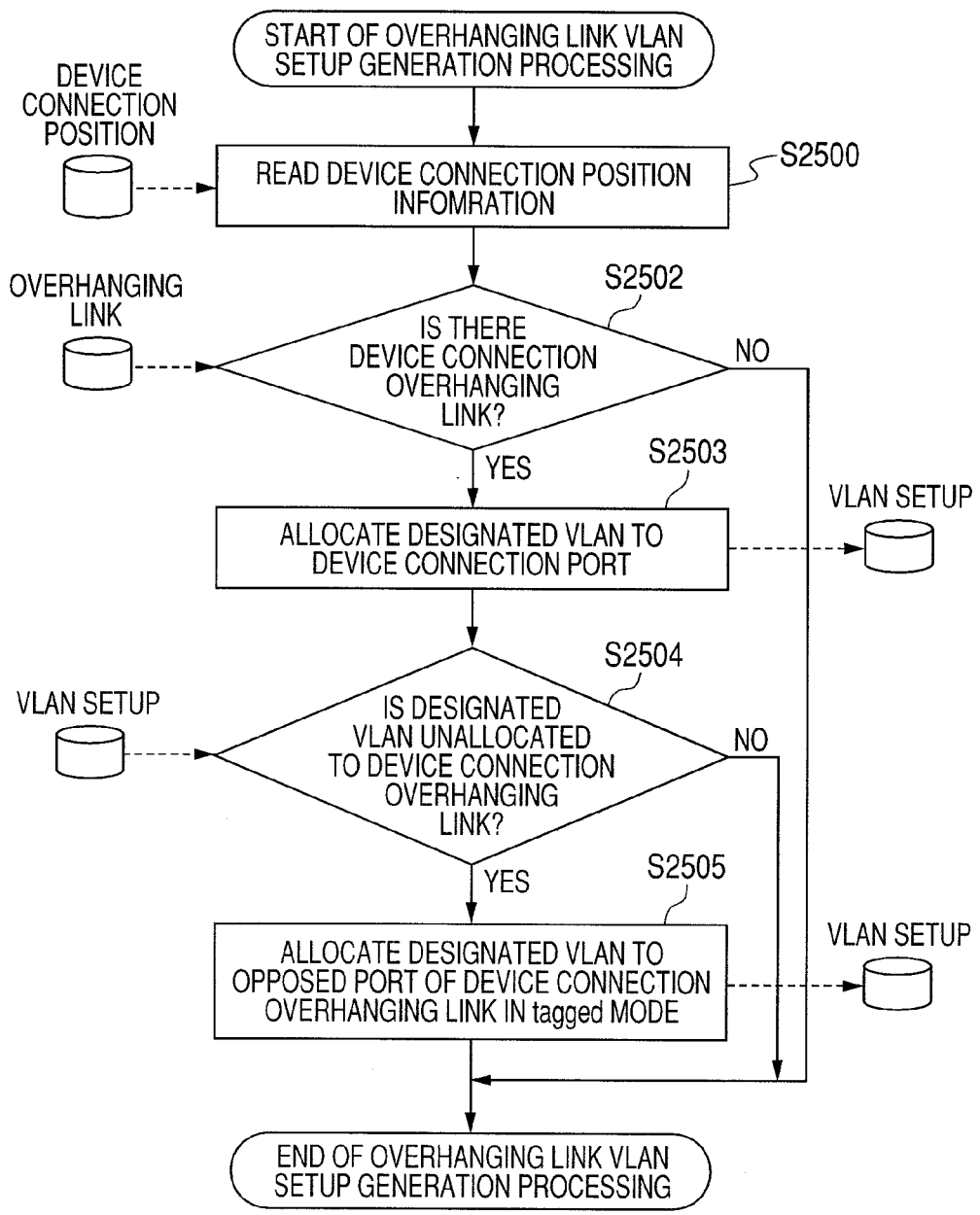
FIG. 30 is a flowchart illustrating an example of an operation flow of an pier link VLAN configuration generation program.

FIG. 30 exemplifies a flowchart showing a flow of the pier link VLAN configuration generation operation by the pier link VLAN configuration generation program 123 of the virtual network management server 1 according to the third embodiment of the present invention. The pier link VLAN configuration generation program 123 executes the pier link VLAN configuration generation (S312) in the VLAN configuration business sequence of FIG. 28.

First, the pier link VLAN configuration generation program 123 reads the device connection position information 130, and acquires the allocation VLAN identifier, the gateway connection node identifier, the gateway connection port number, the base station connection node identifier, and the base station connection port number.

Then, the pier link VLAN configuration generation program 123 checks whether an entry corresponding to the base station connection node identifier acquired by any one of the two connection switches exists in the entry of the pier link information 136, or not (S2502).

When no entry corresponding to the base station connection node identifier exists in the pier link information 136, the pier link VLAN configuration generation program 123 terminates the pier link VLAN configuration generation processing, and returns the processing to the program of the calling source.

When the entry corresponding to the base station connection node identifier exists in the pier link information 136, the pier link VLAN configuration generation program 123 allocates the designated VLAN to the node and the port (device connection port) which are connected with the base station designated in Step S310 (S2503). In this embodiment, the pier link VLAN configuration generation program 123 generates the VLAN configuration so as to accommodate a port P represented by a port identifier 1-1 of the switch 715 in the VLAN 40 as an "untagged" port, and updates the VLAN configuration information 134 (refer to S2503 and 134c in FIG. 31).

Then, the pier link VLAN configuration generation program 123 checks whether the VLAN of the allocation VLAN identifier is unallocated to the device connection pier link, or not (S2504). To achieve this, the pier link VLAN configuration generation program 123 acquires two combinations of the node identifier and the port identifier of the port P that is connected with the pier link from the pier link information 136. Then, the pier link VLAN configuration generation program 123 searches whether an entry corresponding to the VLAN configuration information 134 exists in each of the acquired two combinations, or not.

When the pertinent entry exists in the VLAN configuration information 134, that is, the designated VLAN has been already allocated to the pier link, the pier link VLAN configuration generation program 123 terminates the pier link VLAN configuration generation processing, and returns the processing to the calling source program.

When no pertinent entry exists in the VLAN configuration information 134, that is, when the designated VLAN has not yet been allocated to the pier link, the pier link VLAN configuration generation program 123 allocates the VLAN of the allocation VLAN identifier to two ports P that are connected to the device connection pier link in the "tagged" mode (refer to S2505, and 134a and 134b in FIG. 31).

FIG. 31 shows a state of the VLAN configuration information 134 immediately after the pier link VLAN configuration generation processing S312 has been completed in the third embodiment of the present invention. Through the processing S312, the entries 134a and 134b are added in order to allocate the VLAN 40 to the pier link 81 that is connected with a port 2-1 of the switch 705 whose node identifier is 5, and a port 1-24 of the switch 715 whose node identifier is 15. Likewise, the entry 134c is added in order to allocate the VLAN 40 to the base station connection port.

According to this embodiment, for example, in the network configuration having the pier link shown in FIG. 25, the VLAN can be set up.

Fourth Embodiment

Figure 32:
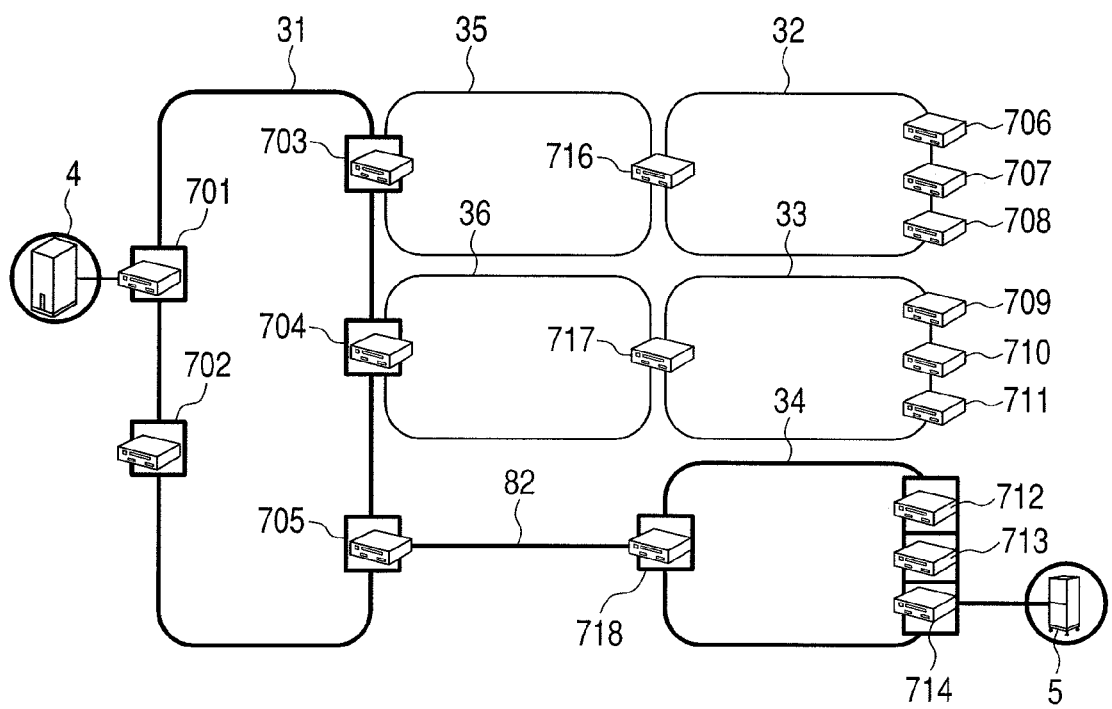
FIG. 32 is a diagram illustrating an example of a network configuration of a three-stage hybrid ring network according to a fourth embodiment.

FIG. 32 shows an example of a configuration of the network 3 to be managed according to a fourth embodiment of the present invention. As in the second embodiment, the fourth embodiment is configured to pass through rings of three or more stages with intervention of a relay ring between the gateway and the base station.

Also, in this embodiment, the pier link shown in the third embodiment is connected to the core ring, and an end of the pier link is further connected with a ring generated by a switch connected with the base station. In this example, such an pier link that conducts a relay between the ring connected with the gateway 4 and the ring connected with the base station 5 is called "relay pier link".

In this embodiment, the core ring 31 that is connected with the gateway 4, and the branch ring 32, the branch ring 33, and the branch ring 34 for connection to the base station exist within the network 3. The branch ring 32, the branch ring 33, and the branch ring 34 are connected to the core ring 32 through the relay ring 35, the relay ring 36, and the relay pier link 82, respectively. In this state, it is assumed that the relay pier link 82 is connected to the switch 705 and the switch 718. Also, it is assumed that the node identifiers of 1 to 18 are allocated to the switches 701 to 718 that configure the rings, respectively.

Bold lines in FIG. 32 represent links to which the identical VLAN needs to be allocated for the purpose of creating the virtual communication path between the gateway 4 and the base station 5. Also, the switches 7 each surrounded by a box indicated by a bold line in FIG. 32 represent the switches 7 to which the VLAN needs to be set up, likewise. In this embodiment, there is a need to set up the identical VLAN to all of the links that configure the ring 31, all of the links that configure the ring 34, and the relay pier link.

When there is the relay pier link in the network, no VLAN is set up to a portion of the relay pier link by only the relay ring VLAN configuration generation processing shown in the second embodiment. For that reason, no virtual communication path cannot be created between the gateway 4 and the base station 5.

In order to generate the VLAN including the relay pier link 82, the virtual network management server 1 according t the fourth embodiment further includes a relay pier link VLAN configuration generation program 124, pier link information 136 added with storage information, and so on, in the virtual network management server 1 shown in FIG. 3.

Figure 33:
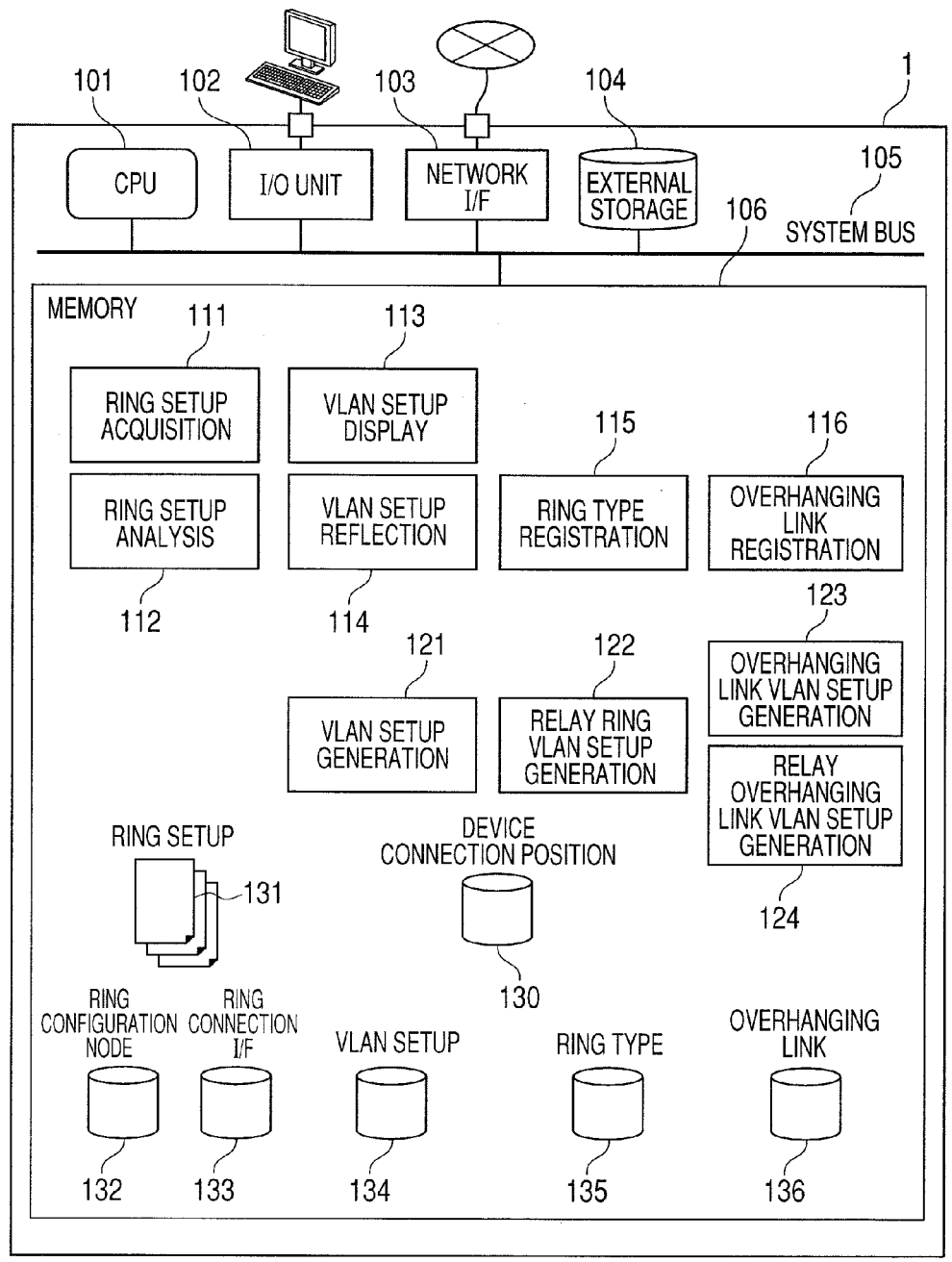
FIG. 33 is a diagram illustrating a configuration example of a virtual network management server according to the fourth embodiment.

FIG. 33 shows a configuration example of the virtual network management server 1 according to the fourth embodiment of the present invention. The configuration of the virtual network management server 1 is largely common to the configuration of the virtual network management server 1 in the first embodiment of the present invention shown in FIG. 3. For that reason, the different configurations will be mainly described.

The virtual network management server 1 reads the ring type registration program 115 and the overhanging registration program 116 on the memory 106, and executes those programs, in addition to the configuration of the virtual network management server 1 according to the first embodiment of the present invention. Also, the virtual network management server 1 includes the ring type information 135 and the pier link information 136, which are used by those programs 122 to 124, on the memory 106.

FIG. 34 shows a configuration example of the pier link information 136 provided in the virtual network management server 1 according to the fourth embodiment. The pier link information 136 is represented by a table having, as one entry, the combination of the identifier 1361 for uniquely identifying the pier link within the network, the identifier 1362 of a switch that is connected to one end of the pier link, the number 1363 of a port used for connection of the pier link with the switch, the identifier 1364 of a switch that is connected to the other end of the pier link, the number 1365 of a port used for connection of the pier link with the switch, and the type 1366 that represents the type of the pier link.

Any one of an identifier "relay" indicative of the relay pier link, and an identifier "contents" indicative of the pier link which accommodates the base station shown in the third embodiment is set up in the ring type 1366 of the pier link information 136.

This example shows a case in which an entry 136b representative of the pier link 82 in which the pier link identifier is 1 is created. The entry 136b represents that the pier link 82 connects a port indicated by the port number 2-1 of the switch 705 having the switch identifier 5 to a port indicated by the port number 1-1 of the switch 718 having the switch identifier 18, and the link type is the relay pier link.

Figure 35:
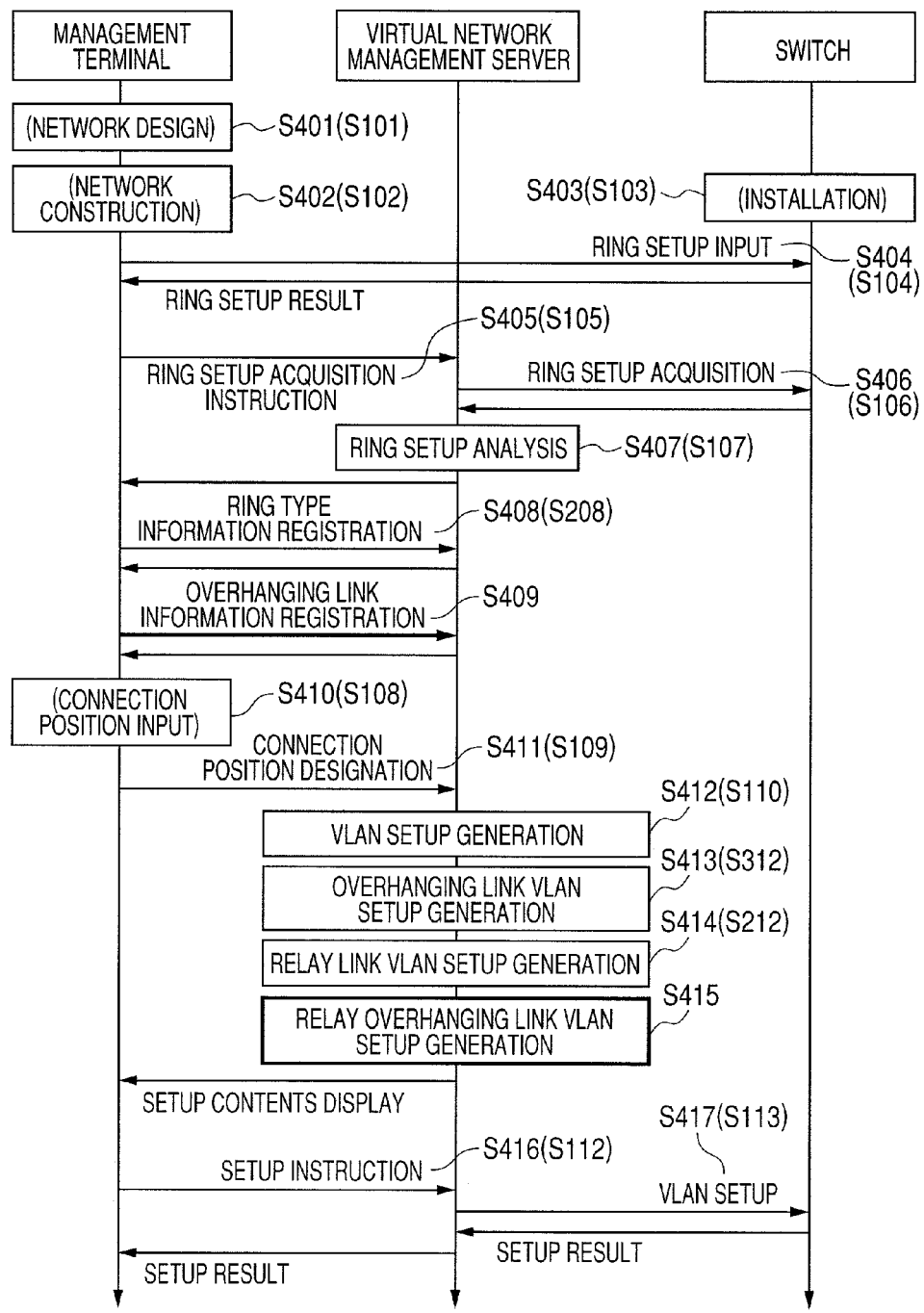
FIG. 35 is a diagram illustrating an example of a VLAN configuration sequence according to the fourth embodiment.

FIG. 35 exemplifies a sequence of business for setting the VLAN in order that the manager creates the virtual communication path between the gateway 4 and the base station 5 by using the virtual network management server 1 according to the fourth embodiment. This sequence diagram is largely common to the sequence in the first embodiment shown in FIG. 5, the sequence in the second embodiment shown in FIG. 21, or the sequence in the third embodiment shown in FIG. 28. For that reason, the same processing as that in the second embodiment and the third embodiment is denoted by identical symbols, and their description will be omitted, and the sequence according to the fourth embodiment mainly including parts different from those sequences will be described.

As in the first to third embodiments, when the manage constructs the network 3 based on the design result (S401, S402, S403), the management terminal inputs the ring configuration for each of the switches 7 (S404). Then, the management terminal instructs the virtual network management server 1 to acquire the ring configuration (S405). The virtual network management server 1 acquires the ring configuration from each of the rings 7 within the network 3, analyzes the ring configuration, and generates the ring node information 132 and the ring connection I/F information 133 (S406, S407). Then, as in the second embodiment, the virtual network management server 1 sets up the ring types of all the rings within the network 3 to the ring type information 135 by using the ring type information setup screen 1901 of FIG. 22 (S408).

In the fourth embodiment, subsequent to the ring type information registration, the management terminal executes the pier link information registration through the operation of the manager (S409). In the pier link information registration work, the management terminal registers information on the relay pier link and the accommodation pier link in the pier link information 136. The fourth embodiment is different from the third embodiment in that the information on the relay pier link is registered in addition to the accommodation pier link.

Then, the manager designates the connection positions of the gateway 4 and the base station 5 as in the first to third embodiments (S411). The gateway/base station connection position designation screen 601 shown in FIG. 6 is used for designation of the connection positions.

Upon acquiring the designated connection positions of the gateway 4 and the base station 5, the virtual network management server 1 generates the VLAN configuration for the ring that is connected with the gateway 4 and the ring that is connected with the base station 5, and updates the VLAN configuration information 134 as in the first to third embodiments (S412). Then, as in the third embodiment, the virtual network management server 1 generates the VLAN configuration of the pier link, and updates the VLAN configuration information 134 (S413). Further, in the second embodiment, the virtual network management server 1 generates the VLAN configuration of the relay ring, and updates the VLAN configuration information 134 (S414).

In the fourth embodiment, unlike the first to third embodiments, in addition to the above VLAN configuration generation processing, the relay pier link VLAN configuration generation program 124 of the virtual network management server 1 generates the VLAN configuration for the relay pier link, and updates the VLAN configuration information 134 (S415). The detailed processing will be described later.

Upon completion of those VLAN configuration generation processing S412 to S415, the virtual network management server 1 displays the contents of the VLAN configuration on the screen of the management terminal based on the updated VLAN configuration information 134 as in the first to third embodiments.

The manager confirms whether any problem arises on the VLAN configuration generated by the virtual network management server 1, or not. If there is no problem, the management terminal instructs the virtual network management server 1 to conduct the VLAN configuration through the operation of the manager (S416). Upon receiving the instruction from the manager, the virtual network management server 1 sets up the VLAN to the switch 7 to be set up (S417), and displays the setup result on the screen.

Figure 36:
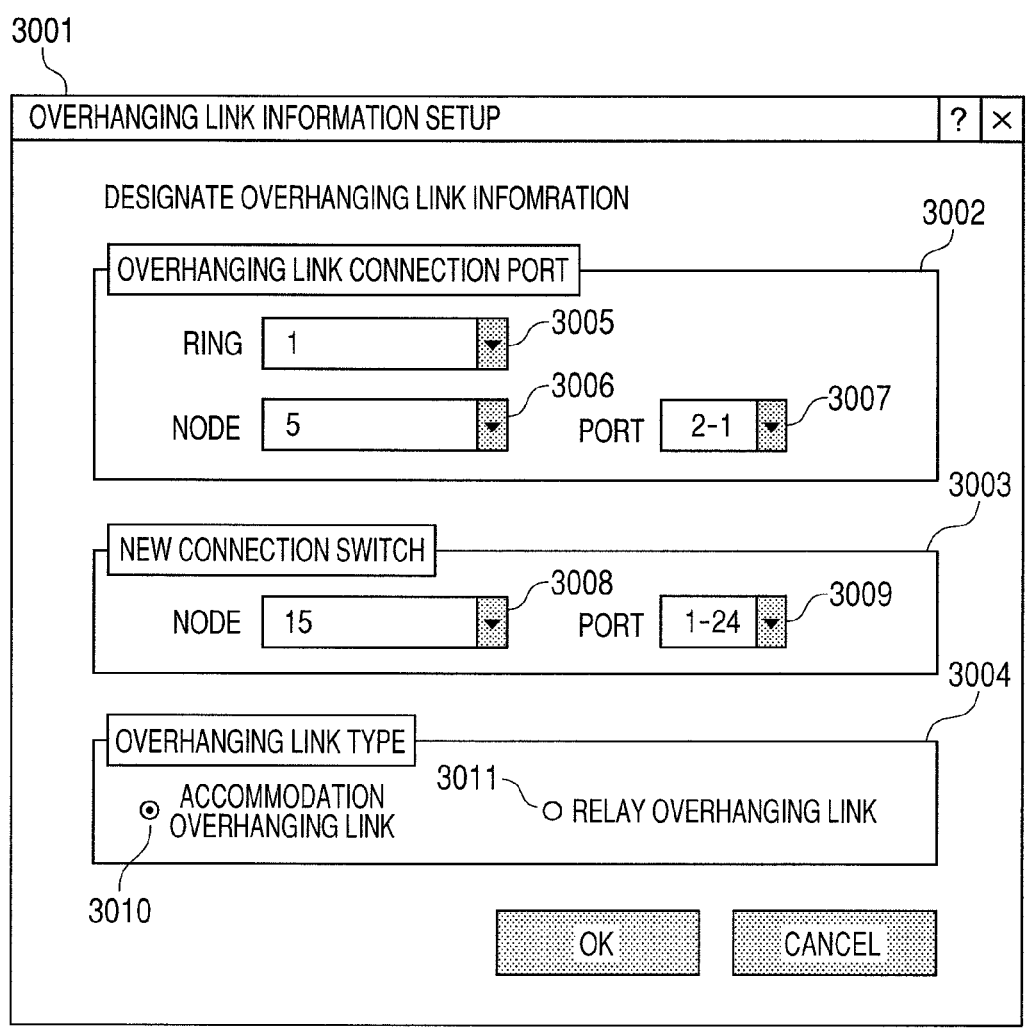
FIG. 36 is a diagram illustrating a configuration example of an pier link information registration screen according to the fourth embodiment.

FIG. 36 shows a configuration example of an pier link information registration screen, which is displayed on the screen by the pier link registration program 116 of the virtual network management server 1 according to the fourth embodiment. In implementing the pier link information registration work S409 in the sequence of FIG. 35, the manager registers the information on the pier link within the network in the pier link information 136 by using the pier link information registration screen.

An pier link information registration screen 3001 includes an pier link connection port input area 3002, a new connection switch input area 3003, and an pier link type input area 3004.

The pier link connection port input area 3002 is an input area for inputting information on the existing switch that is connected with the pier link by the manager. The area 3002 includes a ring identifier input box. 3005, a node identifier input box 3006, and a port number input box 3007.

The new connection switch input area 3003 is an input area for inputting information on the switch that is connected to an end of the pier link by the manager. The new connection switch input area 3003 includes a node identifier input box 3008 and a port identifier input box 3009.

The pier link type input area 3004 is an input area for inputting the type of the pier link that is registered on the screen by the manager. The pier link type input area 3004 includes, for example, two radio buttons 3010 and 3011 of the selection type. The radio button 3010 is a radio button for inputting the relay pier link as the pier link type. Also, the radio button 3011 is a radio button for inputting the accommodation pier link as the pier link type.

Figure 37:
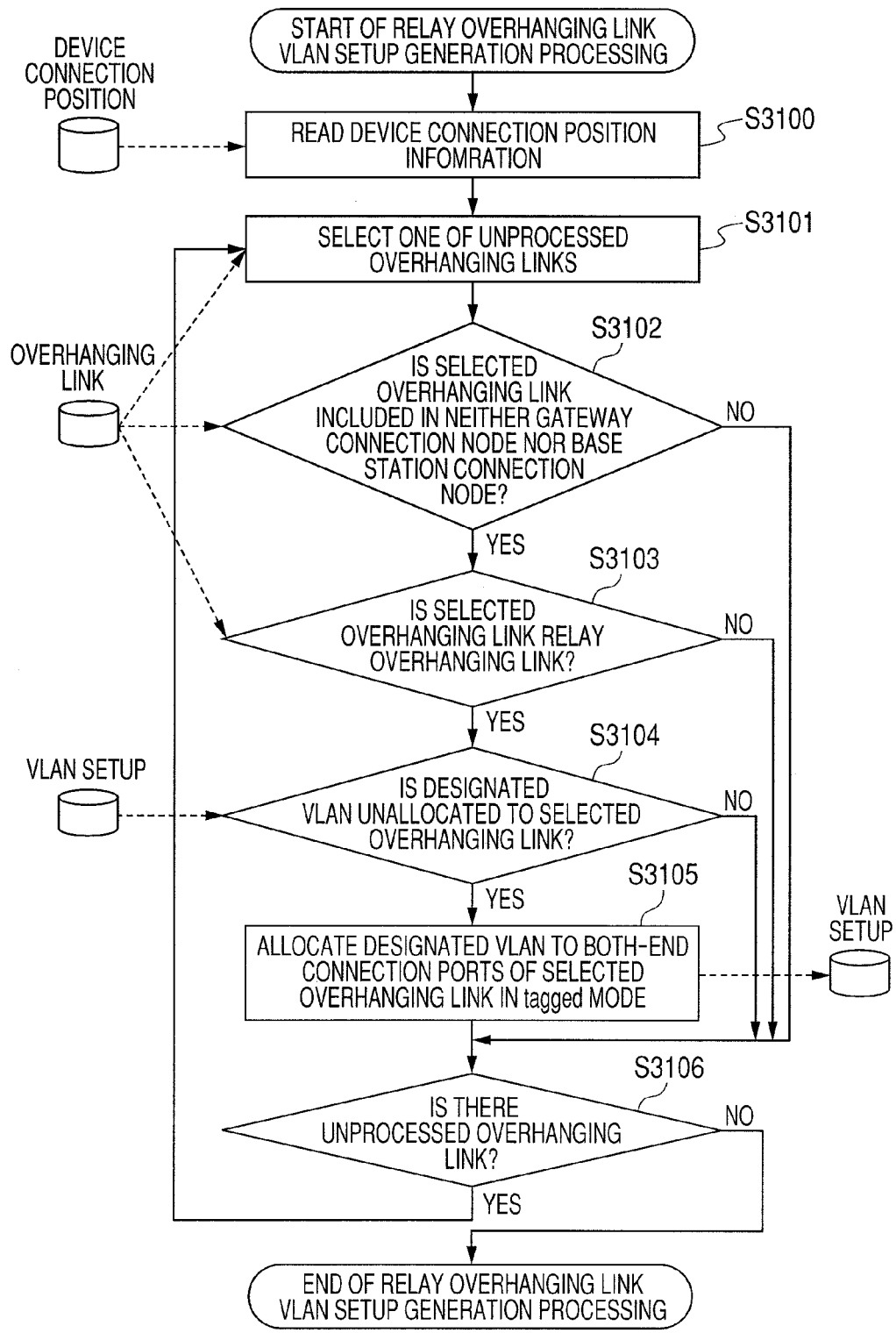
FIG. 37 is a flowchart illustrating an example of an operation flow of a relay pier link VLAN configuration generation program.

FIG. 37 exemplifies a flowchart showing the operation flow of the relay pier link VLAN configuration generation processing S415 shown in the sequence of FIG. 35. The relay pier link VLAN configuration generation program 124 executes the processing S415 according to this flowchart.

First, the relay pier link VLAN configuration generation program 124 reads the device connection position information 130, and acquires the allocation VLAN identifier, the gateway connection node identifier, the gate connection port number, the base station connection node identifier, and the base station connection port number.

The relay pier link VLAN configuration generation program 124 selects one entry of the unprocessed pier link from the pier link information 136, and reads the respective information of the entry (S3101). Then, the relay pier link VLAN configuration generation program 124 checks whether the selected pier link is an pier link that is connected to neither the gateway 4 nor the base station 5, or not (S3102). In order to check whether the pier link is an pier link that satisfies this condition, or not, the relay pier link VLAN configuration generation program 124 checks whether both of the two node identifiers provided in the selected entry of the pier link information match neither the gateway connection node identifier nor the base station connection node identifier, or not.

When the selected pier link is connected to any gateway 4 or any base station 5, in the pier link VLAN configuration generation processing S413 that has been executed before the above processing, the setup for allocating the VLAN to the selected pier link is generated. For that reason, the relay pier link VLAN configuration generation program 124 terminates the processing related to the selected pier link, and checks whether there is the unprocessed pier link in the pier link information 136, or not (S3106), and when there is the unprocessed pier link, the relay pier link VLAN configuration generation program 124 again executes the processing from the start of the flowchart.

When the selected overhanging ring is connected to neither the gateway 4 nor the base station 5, the relay pier link VLAN configuration generation program 124 checks whether the selected pier link is the relay pier link, or not (S3103). When a value of the link type of the pertinent entry in the pier link information 136 is "relay", the relay pier link VLAN configuration generation program 124 determines that the selected pier link is the relay pier link.

When the selected pier link is not the relay pier link, this pier link becomes an accommodation pier link that is used for connection to the gateway 4 or the base station 5 which is different from that designated by the manager. There is no need to allocate the VLAN to such an accommodation pier link. For that reason, the relay pier link VLAN configuration generation program 124 terminates the processing related to the selected pier link, and checks whether there is the unprocessed pier link in the pier link information 136, or not (S3106). When there is the unprocessed pier link, the relay pier link VLAN configuration generation program 124 again executes the processing from the start of the flowchart.

When the selected pier link is the relay pier link, the relay pier link VLAN configuration generation program 124 checks whether the designated VLAN identifier is unallocated to the entry of the VLAN configuration information corresponding to each of both-end ports of the selected pier link, or not, with reference to the VLAN configuration information 134 (S3104).

When the designated VLAN identifier has been already allocated, there is no need to update the VLAN configuration information 134. For that reason, the relay pier link VLAN configuration generation program 124 terminates the processing related to the selected pier link, and checks whether there is the unprocessed pier link in the pier link information 136, or not (S3106). When there is the unprocessed overhanging ling, the relay pier link VLAN configuration generation program 124 again executes the processing from the start of the flowchart.

When the designated VLAN identifier is unallocated, the relay pier link VLAN configuration generation program 124 updates the VLAN configuration information 134 so as to allocate the VLAN designated in the "tagged" mode to two ports connected to both ends of the selected pier link (S3105).

When a description will be made according to the acquired data, the relay pier link VLAN configuration generation program 124 stores the allocation VLAN identifier in the VLAN configuration information 134 in association with the node identifier and the port identifier with respect to each pair of the node identifier and the port identifier in the entry of the pier link read in Step S3101.

Finally, the relay pier link VLAN configuration generation program 124 checks whether the unprocessed pier link remains, or not (S3106). When the unprocessed pier link remains, the relay pier link VLAN configuration generation program 124 returns to the start of the flowchart. When the processing of all of the pier links has been completed, the relay pier link VLAN configuration generation program 124 terminates the processing, and returns the processing to the calling source program.

Figure 38:
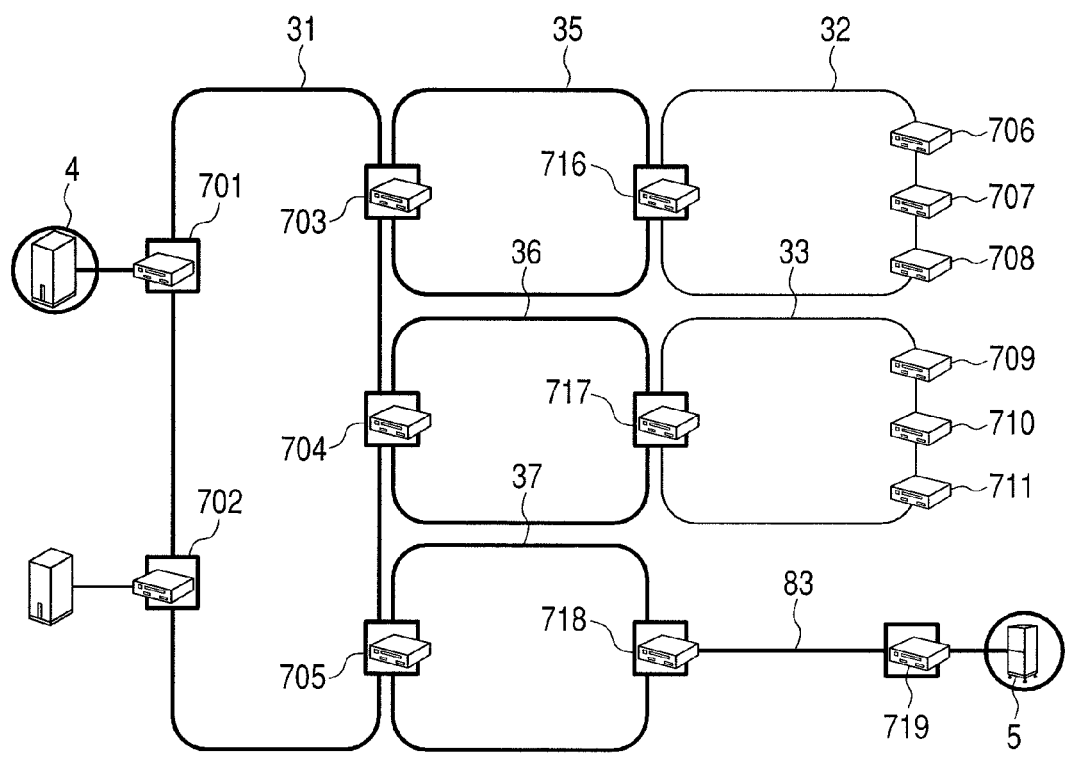
FIG. 38 is a diagram illustrating an example of a network configuration of a three-stage hybrid ring network according to the fourth embodiment.

FIG. 38 shows an example of the network configuration in which the virtual network management server 1 according to the fourth embodiment can create the virtual communication path between the gateway 4 and the base station 5. In the network of this configuration, the switch 719 that is connected with the base station is connected to the relay ring 37 through not the terminal ring but the pier link 83.

When the VLAN configuration generation processing is executed by the virtual network management server according to the fourth embodiment with the above configuration, the VLAN is allocated to the gateway connection port of the ring 31 and all of the ring connection I/F through the VLAN configuration generation processing S412 of FIG. 35. Also, the VLAN is allocated to the pier link 83 through the pier link VLAN configuration generation processing S413. Also, the VLAN is allocated to the rings 35 to 37 through the relay ring VLAN configuration generation processing S414. At the time when the above processing has been completed, all of the generation of the VLAN configuration required to create the virtual communication path between the gateway 4 and the base station 5 have been completed.

In the network configuration, unlike the processing in the network configuration of FIG. 32, when the pier link 83 is selected in the relay pier link VLAN configuration generation processing S415 of FIG. 37, it is determined that the result is "N" in the processing S3102 for determining whether the selected pier link includes neither the gateway connection node nor the base station connection node, or not. For that reason, in this processing, no VLAN is allocated to the pier link 83.

According to this embodiment, the VLAN can be set up, for example, in the network configuration having the relay pier link in the three or more stage ring network as shown in FIG. 32, or in the network configuration having the pier link at the terminal as shown in FIG. 38.

The present invention is applicable to the network system that constructs the virtual network on a packet communication network.

What is claimed is:

1. A virtual network management server that sets up a virtual network for communicating between a gateway and a base station through one or a plurality of rings in a network where a frame is transmitted and received among only a plurality of selected devices within the network by using a virtual network, and a communication range is virtually divided by a virtual network identifier stored in a frame header and a ring connects to the gateway and/or the base station and is configured by a plurality of nodes which are allocated in ring form, the virtual network management server comprising:
    a ring node information storage region in which the combination of a ring identifier and node identifiers of the nodes that configure the ring are stored; and
    a processing unit,
    wherein the processing unit designates a first node identifier of a first node that is connected with the gateway, and a second node identifier of a second node that is connected with the base station,
    wherein the processing unit specifies a node identifier belonging to the same ring as that of the first node of the designated first node identifier, and a node identifier belonging to the same ring as that of the second node of the designated second node identifier with reference to the ring node information storage region, and
    wherein the processing unit transmits a setup instruction for setting up the virtual network between the gateway and the base station to the respective nodes indicated by the specified node identifiers.

2. The virtual network management server according to claim 1, wherein the network is configured so that the ring that is connected with the gateway is connected directly to the ring that is connected with the base station, or the gateway and the base station are connected to the same ring.

3. The virtual network management server according to claim 1, further comprising:
    a ring connection I/F information storage region in which the combination of the node identifier, the ring identifier, and two port identifiers that represent two ports used for connection of the ring indicated by the ring identifier with the node indicated by the node identifier are stored, wherein the processing unit acquires two port identifiers based on the specified node identifier, and the ring identifier of the ring to which the designated first or second node identifier belongs with reference to the ring connection I/F information storage region, and wherein the processing unit transmits the setup instruction including the two port identifiers for setting up the virtual network between the gateway and the base station to the ports indicated by the port identifiers to the node indicated by the node identifier.

4. The virtual network management server according to claim 3, further comprising:

a virtual network setup information storage region in which the combination of the node identifiers, the port identifiers, and one or a plurality of virtual network identifiers that is allocated to the ports indicated by the port identifiers of the node indicated by the node identifier are stored, wherein the processing unit stores the virtual network identifier of the virtual network to be set up in the virtual network setup information storage region in correspondence with the specified node identifier and the port identifier with respect to each of the acquired two port identifiers.

5. The virtual network management server according to claim 4, wherein the virtual network setup information storage region further stores an identifier indicative of the type of the virtual network indicating whether the virtual network is tagged or untagged therein, wherein the processing unit stores an identifier indicative of the type of the virtual network indicative of untagged in the virtual network setup information storage region with respect to a first port of the first node that is connected with the gateway, and a second port of the second node that is connected with the base station, and wherein the processing unit stores an identifier indicative of the type of the virtual network indicative of tagged in the virtual network setup information storage region with respect to ports other than the first port of the first node that is connected with the gateway, and the second port of the second node that is connected with the base station.

6. The virtual network management server according to claim 3, wherein the network has one or a plurality of relay rings connected between the ring that is connected with the gateway and the ring that is connected with the base station, and has three or more stage rings existing on a path between the gateway and the base station, wherein the virtual network management server further includes a ring type information storage region stores the combination of the ring identifier, and a ring type indicating whether the ring is an accommodation ring that accommodates the gateway or the base station, or a relay ring that conducts a relay between the accommodation rings therein, wherein the processing unit further extracts the ring identifier indicating that the ring type of the ring type information storage region is the relay ring, specifies the node identifier that configures the ring indicated by the extracted ring identifier with reference to the ring node information storage region, acquires corresponding two port identifiers of each of the node identifiers based on the extracted ring identifier and the specified node identifier with reference to the ring connection I/F information, and transmits a setup instruction for setting up the virtual network to the ports indicated by the acquired two port identifiers to the node indicated by the specified node identifier.

7. The virtual network management server according to claim 6, wherein the processing unit inputs the ring identifier and the ring type from the input unit, and stores the ring identifier and the ring type in the ring type information storage region.

8. The virtual network management server according to claim 3, wherein the network has an pier link that is a link that overhangs from one of the nodes which configure the ring, wherein the virtual network management server further includes an pier link information storage region in which the combination of a third node identifier of a third node that is connected with one end of the pier link, a third port identifier of a third port for pier link connection of the third node, a fourth node identifier of a fourth node that is connected with the other end of the pier link, and a fourth port identifier of a fourth port for pier link connection of the fourth node is stored, and wherein the processing unit further, when any one of the third and fourth node identifiers of the pier link information storage region matches the second node identifier that is connected with the base station, transmits a setup instruction for setting up the virtual network to the third port indicated by the third port identifier to the third node indicated by the third node identifier, and transmits a setup instruction for setting up the virtual network to the fourth port indicated by the fourth port identifier to the fourth node indicated by the fourth node identifier.

9. The virtual network management server according to claim 8, wherein each of the setup instructions to the third node and the fourth node includes an instruction for setting up the virtual network so as to transmit or receive a tagged frame of the virtual network.

10. The virtual network management server according to claim 8, wherein one or a plurality of relay rings is connected between the pier link and the rink that is connected with the gateway, wherein the virtual network management server further includes a ring type information storage region in which the combination of the ring identifier and the ring type indicating whether the ring is an accommodation ring that accommodates the gateway or the base station, or a relay ring that conducts a relay between the accommodation rings is stored, and wherein the processing unit further extracts the ring identifier indicating that the ring type of the ring type information storage region is the relay ring, specifies the node identifier that configures the ring indicated by the extracted ring identifier with reference to the ring node information storage region, acquires corresponding two port identifiers for each of the node identifiers based on the extracted ring identifier and the specified node identifier with reference to the ring connection I/F information, and transmits a setup instruction for setting up the virtual network to the ports indicated by the acquired two port identifiers to the node indicated by the specified node identifier in the node indicated by the specified node identifier.

11. The virtual network management server according to claim 3, wherein the network includes at least one pier link between the ring that is connected with the gateway and the ring that is connected with the base station, wherein the virtual network management server further includes an pier link information storage region in which the combination of a third identifier of a third node that is connected to one end of the pier link, a third port identifier of a third port for pier link connection of the node, a fourth node identifier of a fourth node that is connected to the other end of the pier link, a fourth port identifier of a fourth port for pier link connection of the node, and a rink type indicating whether the rink is the accommodation overhanging rink having the base station connected to the node of one end thereof, or the relay pier link having the rings connected to the nodes of both ends thereof is stored, and wherein, in an entry where the link type of the pier link information storage region represents the relay overhanging rink, the virtual network management server transmits a setup instruction for setting up the virtual network to the third node indicated by the third node identifier, to the third node indicated by the third node identifier of the entry, and a setup instruction for setting up the virtual network to the fourth node indicated by the fourth node identifier, to the fourth node indicated by the fourth node identifier of the entry.

12. The virtual network management server according to claim 1, wherein the processing unit acquires ring configuration information including the node identifier and the ring identifier of one or a plurality of rings to which the node indicated by the node identifier belongs from the respective nodes that configure the network, and wherein the processing unit stores the respective information of the ring node information storage region based on the ring configuration information from the respective nodes.

13. The virtual network management server according to claim 12, wherein the ring configuration information further includes two port information used for connection of the ring with the node, and wherein the processing unit stores the respective information of the ring connection I/F information storage region based on the ring configuration information from the respective nodes.

14. The virtual network management server according to claim 1, wherein the processing unit inputs the virtual network identifier of the virtual network to be set up, the first node identifier of the first node that is connected with the gateway, and the second node identifier of the second node that is connected with the base station from an input unit, and wherein the setup instruction to each node includes the input virtual network identifier.

15. A network system that transmits and receives a frame among only a plurality of selected devices within the network by using a virtual network in which a communication range is virtually divided by a virtual network identifier stored in a frame header, the network system comprising:

a ring connects to the gateway and/or the base station and is configured by a plurality of nodes which are allocated in ring form; and a virtual network management server that sets up a virtual network for communicating between a gateway and a base station through one or a plurality of rings, wherein the virtual network management server includes:

a ring node information storage region in which the combination of a ring identifier and node identifiers of the nodes that configure the ring are stored; and a processing unit, wherein the processing unit designates a first node identifier of a first node that is connected with the gateway, and a second node identifier of a second node that is connected with the base station, wherein the processing unit specifies a node identifier belonging to the same ring as that of the first node of the designated first node identifier, and a node identifier belonging to the same ring as that of the second node of the designated second node identifier with reference to the ring node information storage region, and wherein the processing unit transmits a setup instruction for setting up the virtual network between the gateway and the base station to the respective nodes indicated by the specified node identifiers.

\* \* \* \* \*

UNITED STATES PATENT AND TRADEMARK OFFICE
CERTIFICATE OF CORRECTION

PATENT NO. : 8,588,236 B2  
APPLICATION NO. : 12/852242  
DATED : November 19, 2013  
INVENTOR(S) : Okita et al.

Page 1 of 1

It is certified that error appears in the above-identified patent and that said Letters Patent is hereby corrected as shown below:

On the title page item (73) should read as follows:

(73)  Assignees:  Hitachi, Ltd.; Tokyo (JP)

Signed and Sealed this  
Sixteenth Day of September, 2014

Michelle K. Lee  
*Deputy Director of the United States Patent and Trademark Office*